United States Patent [19]

Takahashi

[11] Patent Number: 5,621,440
[45] Date of Patent: Apr. 15, 1997

[54] BIDIRECTIONAL RECORDING DEVICE AND METHOD FOR PRODUCING CONSISTENT IMAGES

[75] Inventor: Kazuyoshi Takahashi, Kawasaki, Japan

[73] Assignee: Canon Kabushiki Kaisha, Tokyo, Japan

[21] Appl. No.: 22,618

[22] Filed: Feb. 19, 1993

Related U.S. Application Data

[63] Continuation of Ser. No. 759,815, Aug. 30, 1991, abandoned, which is a continuation of Ser. No. 679,832, Apr. 1, 1991, abandoned, which is a continuation of Ser. No. 514,715, Apr. 26, 1990, abandoned.

[30] Foreign Application Priority Data

| Apr. 28, 1989 | [JP] | Japan | 1-111183 |
| May 1, 1989 | [JP] | Japan | 1-109072 |
| May 17, 1989 | [JP] | Japan | 1-121455 |
| Apr. 10, 1990 | [JP] | Japan | 2-093157 |

[51] Int. Cl.⁶ .................. B41J 2/05; B41J 2/15
[52] U.S. Cl. .................. 347/12; 347/40; 347/43; 395/108; 395/115
[58] Field of Search .................. 346/140; 358/502; 395/104, 108, 107, 115, 116, 117; 347/13, 12, 40–43, 180–182

[56] References Cited

U.S. PATENT DOCUMENTS

| 4,059,183 | 11/1977 | Hoskins | 347/12 X |
| 4,069,485 | 1/1978 | Martin | 347/12 |
| 4,075,636 | 2/1978 | Galetto et al. | 347/53 |
| 4,084,195 | 4/1978 | Pereira | 347/40 X |
| 4,266,232 | 5/1981 | Juliana | 347/10 |
| 4,528,576 | 7/1985 | Koumura | 347/43 X |
| 4,567,570 | 1/1986 | Peer | 364/519 X |
| 4,614,967 | 9/1986 | Sayanagi | 347/43 X |
| 4,672,391 | 6/1987 | Hakoyama | 347/209 |
| 4,713,684 | 12/1987 | Kawamura et al. | 358/78 |
| 4,723,129 | 2/1988 | Endo | 347/56 |
| 4,730,185 | 3/1988 | Springer | 358/78 X |
| 4,769,648 | 9/1988 | Kishino | 347/5 |
| 4,774,529 | 9/1988 | Paranjpe et al. | |
| 4,812,859 | 3/1989 | Chan et al. | 347/63 |
| 4,985,850 | 1/1991 | Okamoto | 395/109 |

FOREIGN PATENT DOCUMENTS

| 0310217 | 4/1989 | European Pat. Off. . | |
| 3010536 | 10/1981 | Germany . | |
| 3633239 | 4/1987 | Germany | B41J 3/04 |
| 54-6538 | 1/1979 | Japan . | |
| 0006538 | 1/1979 | Japan | B41J 3/04 |
| 56-154065 | 11/1981 | Japan | B41J 2/165 |
| 0110254 | 6/1983 | Japan | B41J 3/00 |
| 0167172 | 10/1983 | Japan | B41J 3/04 |
| 187370 | 11/1983 | Japan . | |
| 0188666 | 11/1983 | Japan | B41J 3/04 |
| 0139473 | 7/1985 | Japan | B41J 5/30 |
| 0192573 | 8/1986 | Japan | B41J 5/00 |
| 0263760 | 11/1986 | Japan | B41J 3/04 |
| 62-164542 | 7/1987 | Japan | B41J 3/04 |
| 13075759 | 2/1989 | Japan . | |
| 2000344 | 1/1979 | United Kingdom | B41J 27/00 |
| 2050252 | 1/1981 | United Kingdom . | |

OTHER PUBLICATIONS

European Search Report for European Patent Appln. No. 90108072.1.

*Primary Examiner*—Joseph W. Hartary
*Attorney, Agent, or Firm*—Fitzpatrick, Cella, Harper & Scinto

[57] ABSTRACT

A recording device which performs recording on a recording medium, comprises a recording head equipped with a row of recording elements arrayed as slanted to the direction vertical to the relative moving direction to said recording medium, and control means which, in dividing the plurality of recording elements constituting said row of recording elements into blocks each of a plurality of recording elements and driving by time division for each of the blocks, stores image data, and in carrying out returning way recording, reads and applies the image data stored in the respective blocks to be driven in the order opposite to that in going way recording.

48 Claims, 31 Drawing Sheets

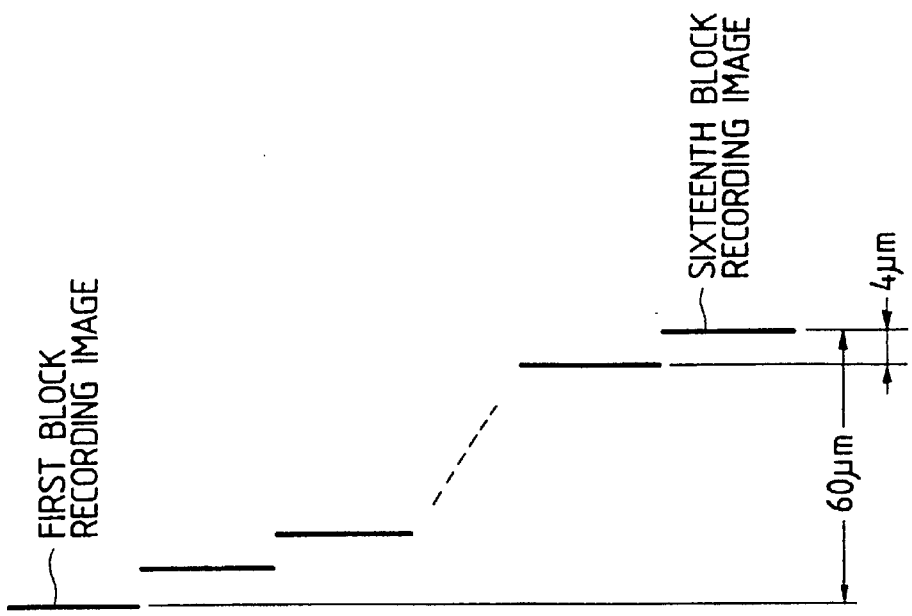
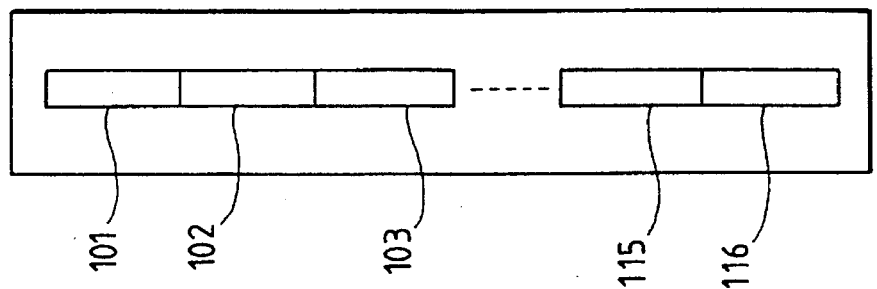

FIG. 6
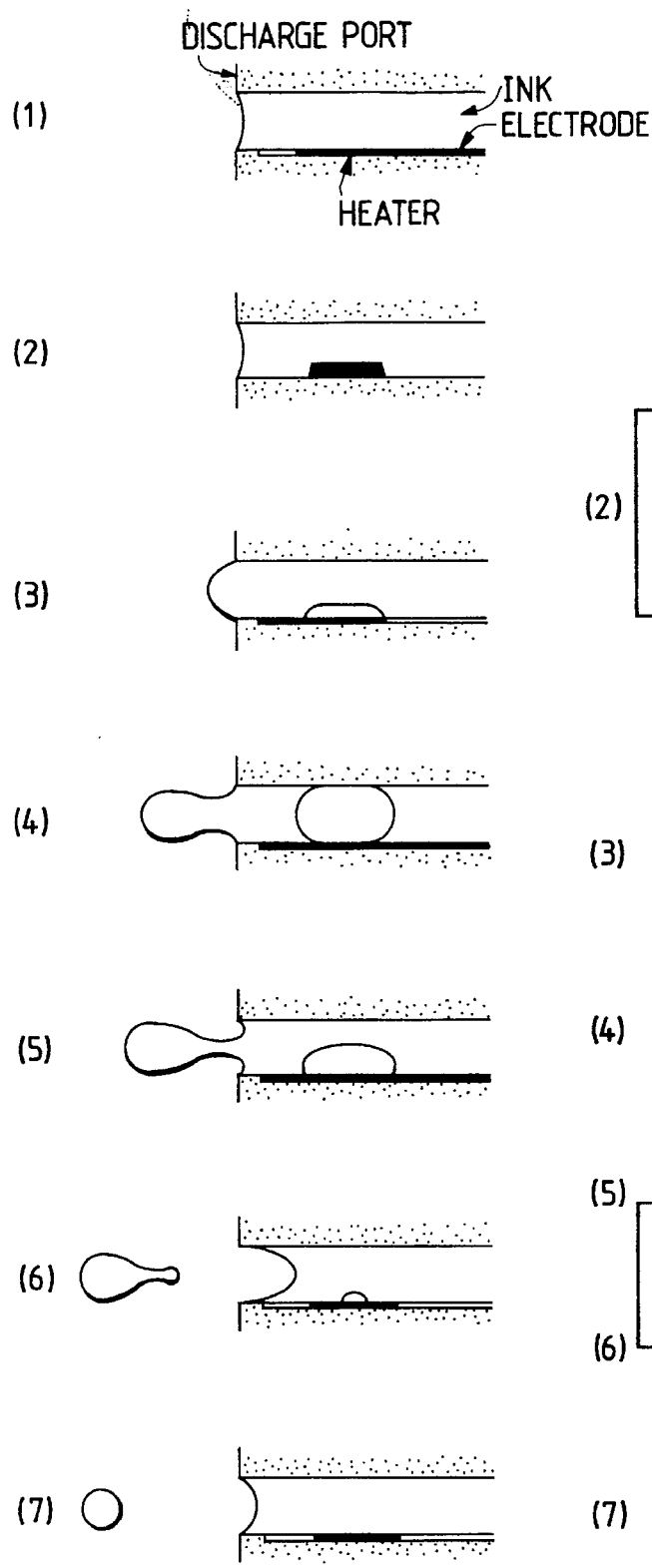
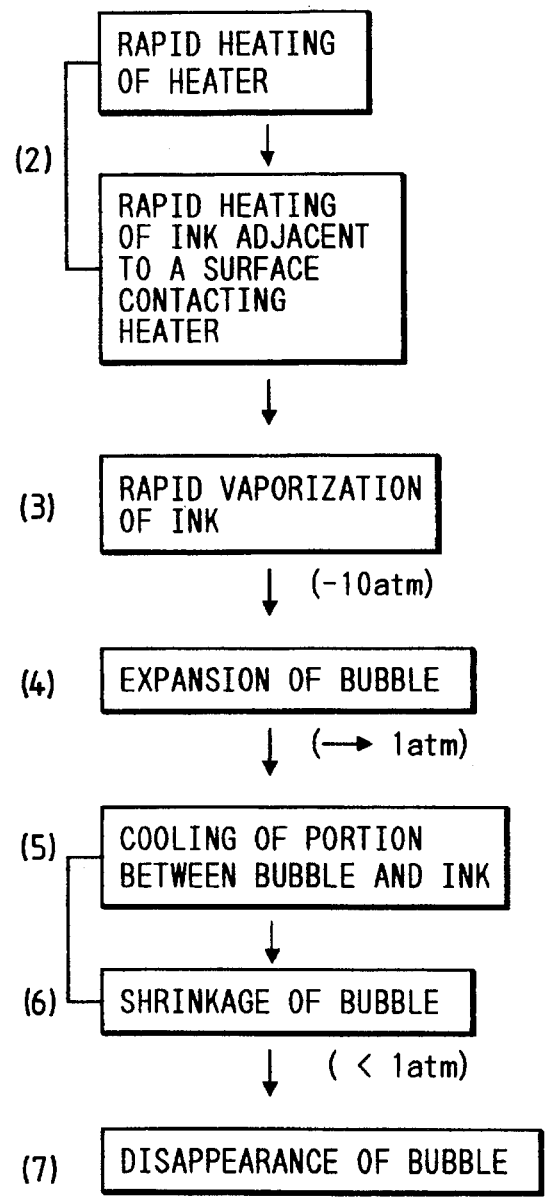

CYAN HEAD

MAGENTA HEAD

YELLOW HEAD

BLACK HEAD

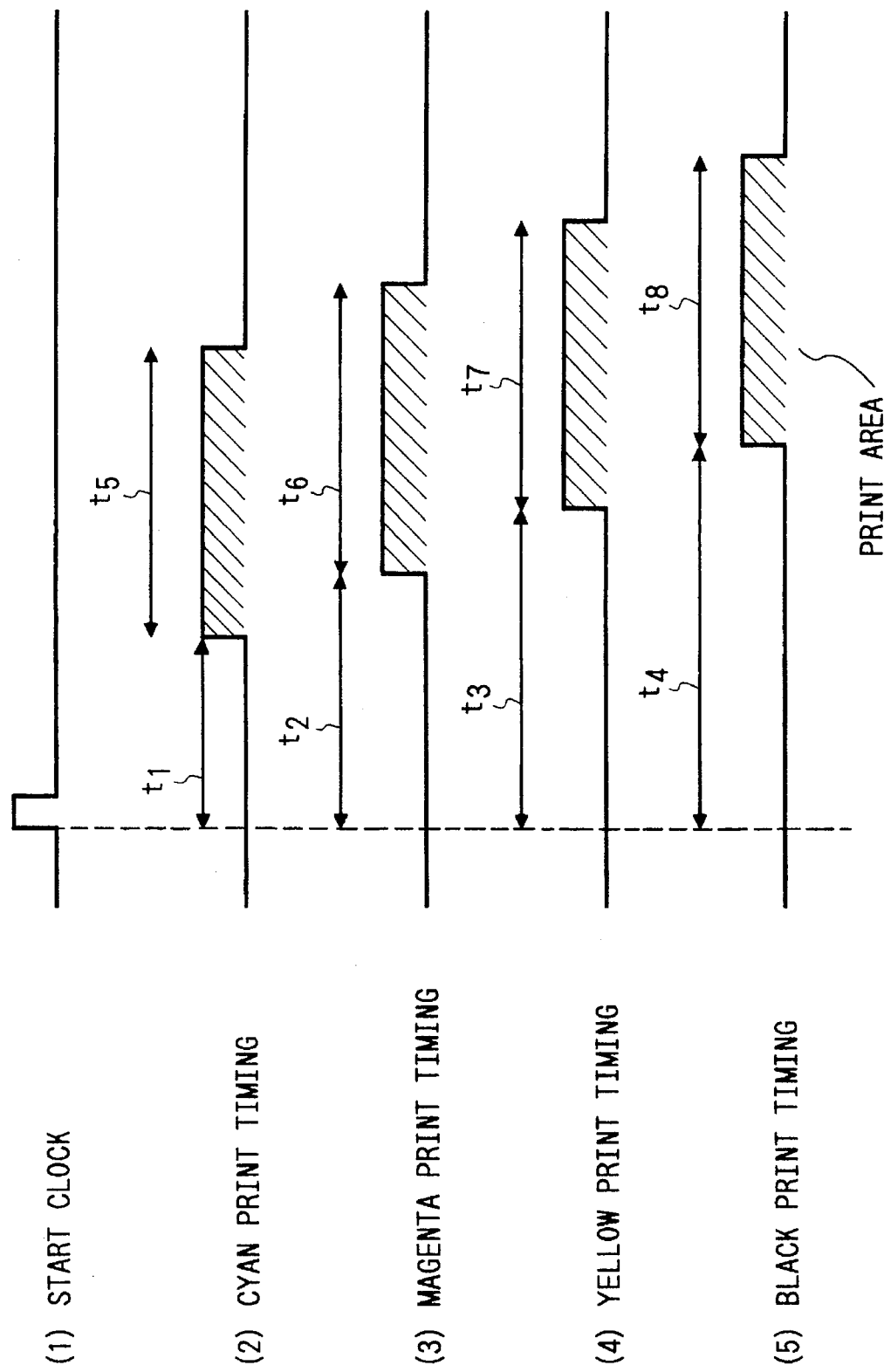

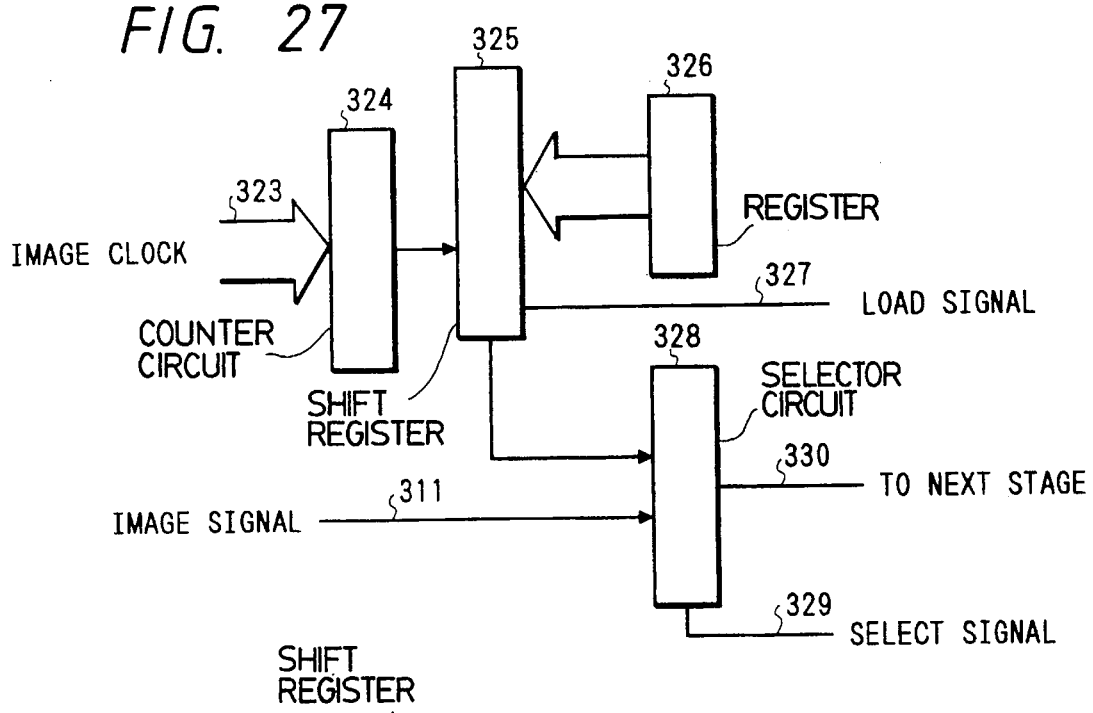
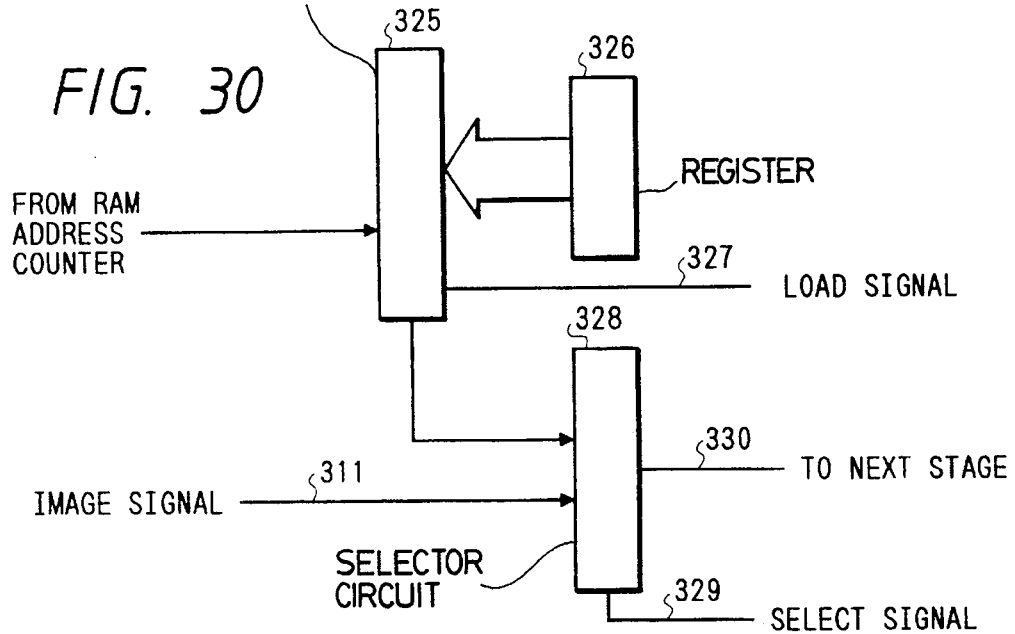

BIDIRECTIONAL RECORDING DEVICE AND METHOD FOR PRODUCING CONSISTENT IMAGES

This application is a continuation of application Ser. No. 07/759,815 filed Aug. 30, 1991, which is now abandoned and which is a continuation of application Ser. No. 07/679,832, filed Apr. 1, 1991, which is abandoned and which is a continuation of application Ser. No. 07/514,715, filed Apr. 26, 1990, also abandoned.

BACKGROUND OF THE INVENTION

1. Field of the Invention

This invention relates to a recording device and a recording method which perform recording on a recording medium.

Here, as the recording device to which the present invention has been applied, there may be included those taking form of copying device, Japanese word processor having key inputting machine, electronic typewriter and further facscimile device having sending and receiving functions in combination with printer, reader, etc. to be used as the image output terminal of information processing machines such as computers, etc. As the recording system, there may be included, for example, the so called heat transfer recording system, heat-sensitive recording system and ink jet recording system (for example, the so called bubble jet recording system or recording system by use of piezoelectric element), etc.

2. Related Background Art

In the prior art, in a recording device of the dot recording system, recording scanning is generally performed with a recording head capable of dot recording of about 24 dots.

When the recording dot number in one row is made a number exceeding 100 for enhancing recording speed, the driving circuits for driving the recording sections corresponding to these dots are also required in number corresponding to the dots. As the result, the drive circuit as a whole becomes larger, leading to elevation in cost, enlargement of machines. For solving this problem, it may be conceivable to divide the recording head section into blocks, driving the respective recording sections divided into blocks by time division, thereby reducing the dot number driven at the same time by the drive circuit.

FIG. 1A shows the block division contents of a liquid jet recording head of the prior art.

In FIG. 1A, 128 discharge openings are divided into 16 blocks and the recording sections 101 to 116 of 16 blocks are arrayed in one row. Accordingly, each recording section has ink discharge openings corresponding to 8 dots as shown in FIG. 1B. Such recording sections 101–116 are driven by time division, and 8 dots are dot recorded at the same time. When ink is discharged through all the discharge openings by moving the recording in the main scanning direction at a constant speed, the interval from the recorded image of the first block to the recorded image of the 16th block becomes approximately 60 μm when the recording density is set at 400 DPI (dot/inch) (FIG. 1C).

Further, the dot interval between adjacent blocks is 4 μm which is as large as corresponding to the size of about one picture element. Accordingly, for making smaller the slippage of recording dots by such time division recording, the recording head is located obliquely as shown in FIG. 2A for carrying out recording scanning. And, as shown in FIG. 2B, it has been proposed to perform recording of the respective dot rows in one row by tolerating only slanting of the dot rows of the respective blocks. The block actuation order at this time is shown in FIG. 3. The arrowhead A shows the main scanning direction (going way direction) of the recording head and the arrowhead B slanted angle.

However, in the recording device of this kind of the prior art, for increasing the speed of recording or obtaining mirror image, returning way recording may be sometimes practiced. In this case, in the recording device of the prior art, since the block driving order is the same as in the going way when the recording head is mainly scanned in the direction by the arrowhead A in FIG. 4A (returning way recording), there was the problem to be solved that the slippage of the recorded image became further greater as shown in FIG. 4B. The arrowhead C indicates the sub-scanning direction.

Further, there was the task to be solved as described below.

For example, in a heat-transfer color printer, it remains necessary to repeat printing for each of the different colored ink ribbons used. In such constitution, since there is no simultaneous driving of a plurality of colors (writing heads), no much result can be expected even if printing speed may be desired to be increased.

Whereas, in a carriage having the respective writing heads of cyan, magenta, yellow and black mounted thereon, image recording becomes possible while performing writing simultaneously, namely corresponding to one scan by one movement. In this case, since there are physical intervals between the respective writing heads, the corresponding delay processing is required.

It is necessary to provide intervals between the heads because these cannot be avoided in constitution. Besides, the head interval, in the case of a printer having a printing density of 400 dpi, will result in color slippage of 1.5 picture elements or more by 100 μm slippage.

In recording natural picture, this is evidently a vital trouble.

In the prior art, for the purpose of correcting such physical interval, RAM's have been employed to form time difference between writing and reading of data.

However, in this case, there ensue the problems as shown below.

(1) Independent RAM's for respective colors must be provided.

(2) Since in RAM with large capacity of low cost has many byte units, the circuit becomes complicated for converting one bit serial data of multi-color to byte data of separate colors.

And, from these problems, the troubles of enlargement and increased cost of the device have been caused to occur.

Further, there has been the task to be solved as described below.

Ordinarily, for example, in a color ink jet printer, there is no substantial difference in printing speed between color printing and monocolor printing.

For increasing the speed, the image clock rate may be increased, but since the driving speed of the writing head for ink jet is limited, no such measure can be taken.

If the driving speed of the writing head for ink jet is increased to a certain value or higher, there will ensue such troubles that the life of the writing head becomes markedly short or that the printing quality is deteriorated.

However, on the other hand, there is in fact a great need that printing speed or copying speed is desired to be made more rapid in monochromatic printing or monochromatic copying (e.g. conventional black color printing).

This may be said to be a requirement as a matter of course in view of high speed printer such as plain paper copying machine under the present situation and LBP (laser beam printer).

Further, there have been the problems to be solved as described below. The tasks to be described below is undischarging in the ink jet recording system. As the countermeasures for the undischarging problem, there have been invented:

(A) the blank discharge actuation which discharges ink compulsorily ink at predetermined timing;

(B) the absorbing actuation which absorbs compulsorily ink at predetermined timing.

In the present invention, of the above-mentioned two items, the former blank discharge actuation is to be described. When performing blank discharge actuation, there are the following problems:

(A) the circuit scale for forming blank discharge data becomes larger to bring about cost-up;

(B) when blank discharge data are formed by CPU (central processing unit), because of considerably large amount of blank discharge data, it takes too much time for data formation, whereby the speed of the printer is lowered.

SUMMARY OF THE INVENTION

An object of the present invention is to provide a recording device and a recording method which can obtain sharp images.

Another object of the present invention is to provide a recording device and a recording method which can obtain images of high quality.

Still another object of the present invention is to provide a recording device and a recording head which can make the image quality of returning way recording the same as that of going way recording even in a recording device with a recording head slanted for time division recording.

Still another object of the present invention is to provide an image processing device which enables memorizing color image data inputted with a simple constitution in an area different in memorizing means.

Still another object of the present invention is to provide an image recording device and a recording method which have enabled inhibition of enlargement and increased cost of the device.

Still another object of the present invention is to provide an image recording device and a recording method which can improve recording speed.

BRIEF DESCRIPTION OF THE DRAWINGS

FIG. 1A is a plan view showing the arrangement of a recording head of a prior art example;

FIG. 1B is a plan view showing the appearance of a recording section of a prior art example;

FIG. 1C is an illustration showing a recording example of a prior art example;

FIG. 6 is an illustration showing the discharge principle of bubble jet of the first example of the present invention;

FIG. 26 is a timing chart showing the actuation of FIG. 25 for illustration of the present invention;

FIG. 27 is an illustration showing the black discharge data generating circuit of another example;

FIG. 30 is an illustration showing another example of the present invention;

DETAILED DESCRIPTION OF THE PREFERRED EMBODIMENTS

Figures 2A, 2B:
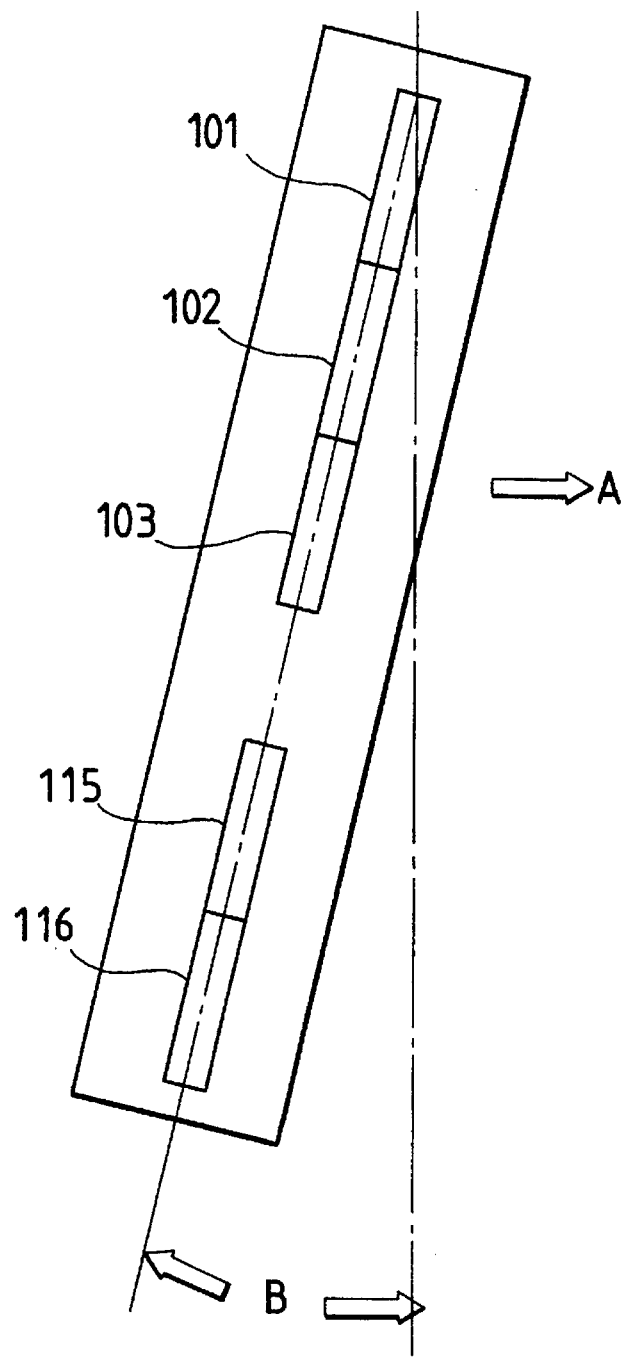
FIG. 2A is an illustration showing the going way recording direction and the slanted angle of a recording head of a prior art example.
FIG. 2B is an illustration showing a recording example of going way recording of a prior art example.
Figure 3:
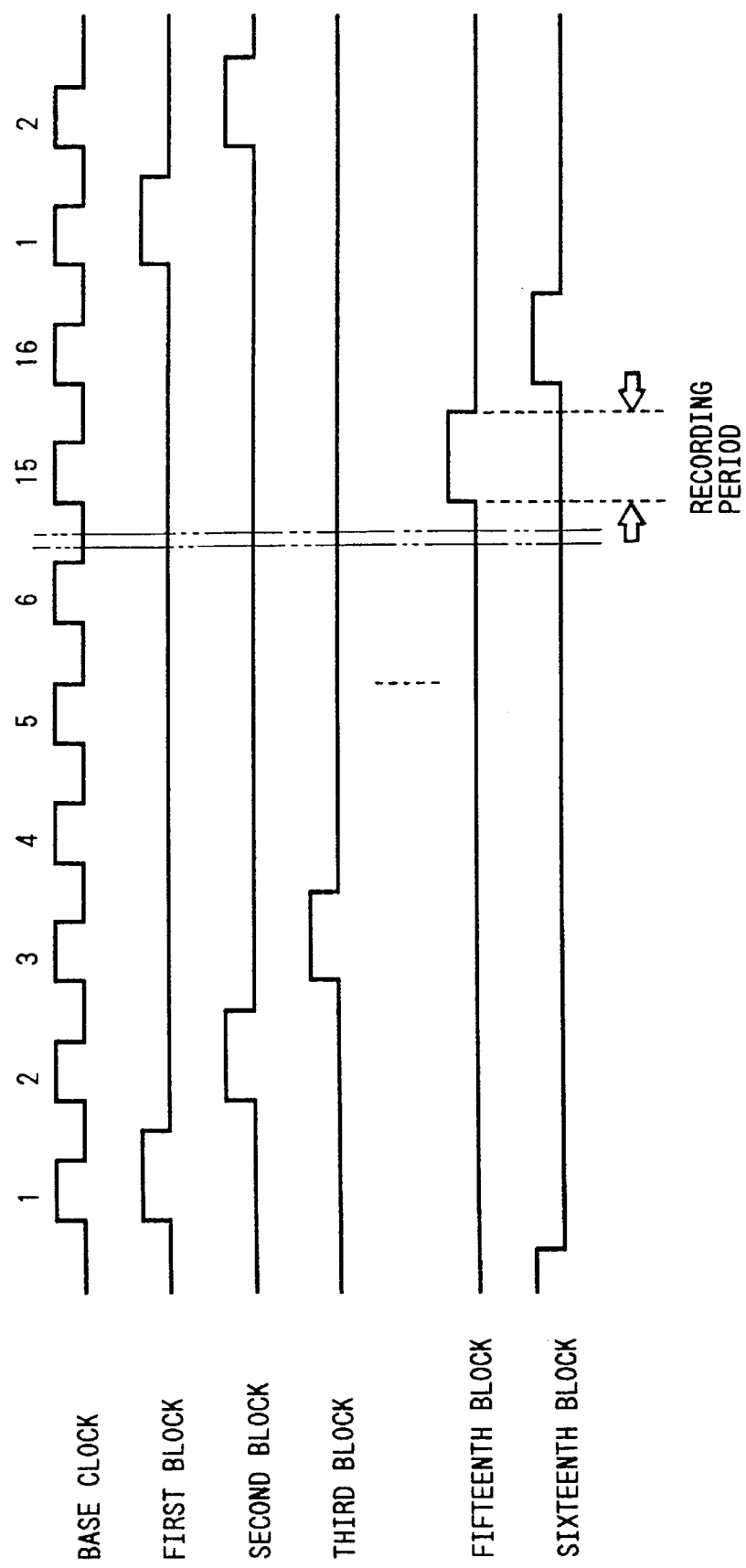
FIG. 3 is a timing chart showing the actuation timing of a prior art example.
Figure 4A:
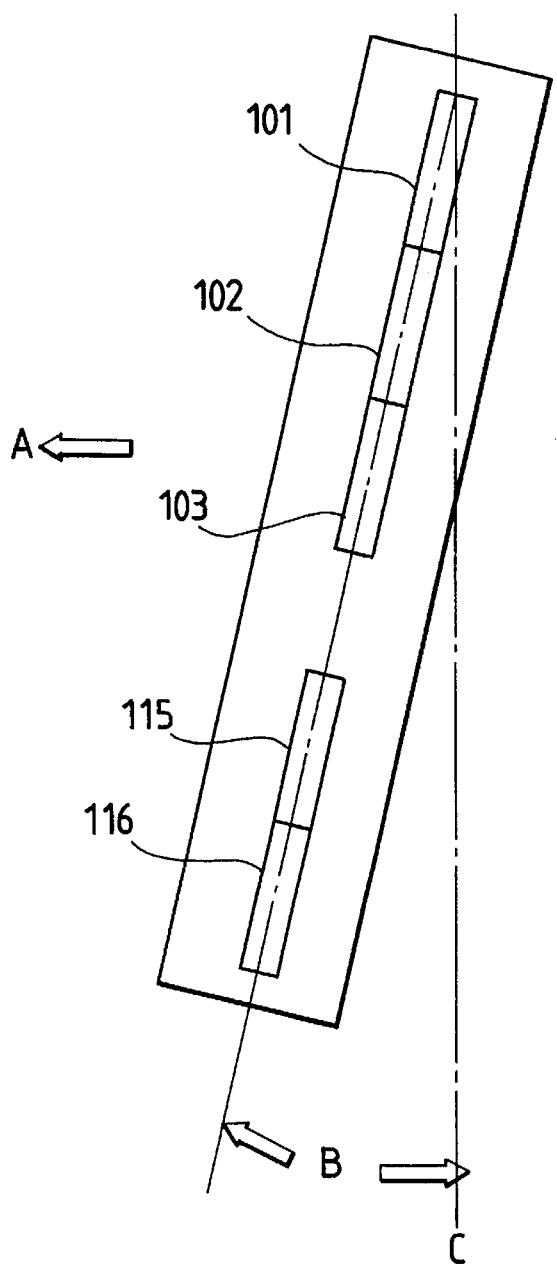
FIG. 4A is an illustration showing the going way recording direction and the slanted angle of a prior art example.
Figure 4B:
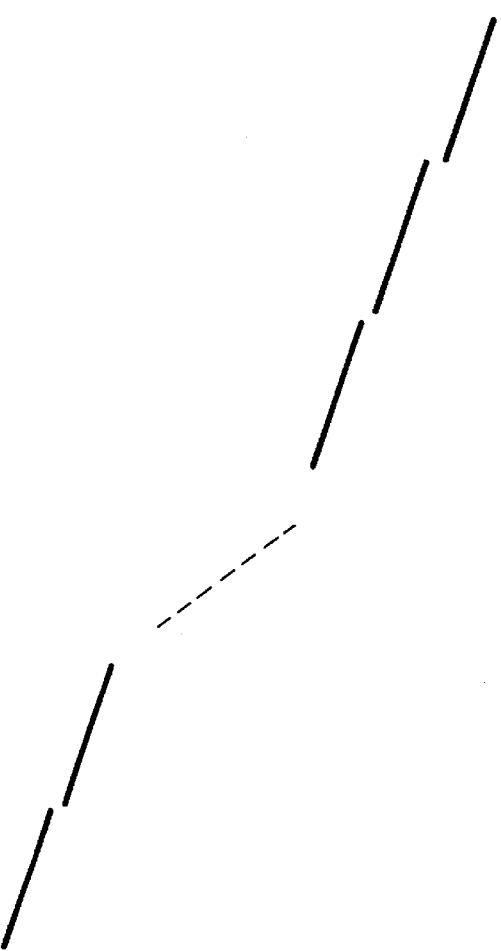
FIG. 4B is an illustration showing a recording example of the returning way recording of a prior art example.

Referring now to the drawings, examples of the present invention are to be described.

First, the modes of the respective examples as described below are to be described.

In the first place, the first mode of the present invention is a recording device having a recording head with a plurality of recording elements for performing dot recording corresponding to image data arrayed in a row, which drives each block of the plurality of recording elements that have been divided into a plurality of blocks by time division and has the array of the plurality of recording elements fixed as slanted with respect to the direction vertical to the relative direction of motion of the recording head for correcting recording slippage of dots which occurs by time division driving, characterized in that it is provided with a memory means which memories temporarily by corresponding the image data to the recording position, a designation means which designates successively the blocks to be driven in the order opposite to that of going way recording during returning way recording, and an image data reading means which reads the image data corresponding to the block designated by the designation means and supplies the data to said designated block.

The second mode of the present invention is characterized in that the image data reading means has an address counter which generates address signals in a certain order and a logic circuit, which sets the output of the address counter as the reading address corresponding to the memory means during going way recording and sets the reversed signal of the output of the address counter as the reading address corresponding to the memory means during returning way recording.

The third mode of the present invention is characterized in that the above-mentioned designation means has an up-down counter capable of counting in the ascending order and the descending order, and the counting order of the up-down counter is changed over depending on whether the recording is going way recording or returning way recording.

The fourth mode of the present invention is characterized in that the above-mentioned designation means and the above-mentioned reading means share a counter, the designation means designates the block by use of the counting result of the counter, and the reading means sets the reading address of the memory means by use of the counting result of the counter.

Next, the fifth mode of the present invention is a recording method, having a recording head with a plurality of recording elements for performing dot recording corresponding to image data arrayed in a row, which drives each block of the plurality of recording elements divided into a plurality of blocks by time division and has the array of the plurality of recording elements fixed as slanted with respect to the direction vertical to the relative moving direction of the recording head for correcting recording slippage of dots which occurs by time division driving, characterized in that the image data are temporarily stored in the memory means corresponding to the recording position, the blocks to be driven are successively designated in the order opposite to going way recording during returning way recording, and the image data corresponding to said designated block are read from the memory means and supplied to said designated block.

Referring now to the drawings, examples of the present invention are to be described in detail.

First, the construction of a bubble jet recording device to which the present invention has been specifically applied is to be described.

Figure 5:
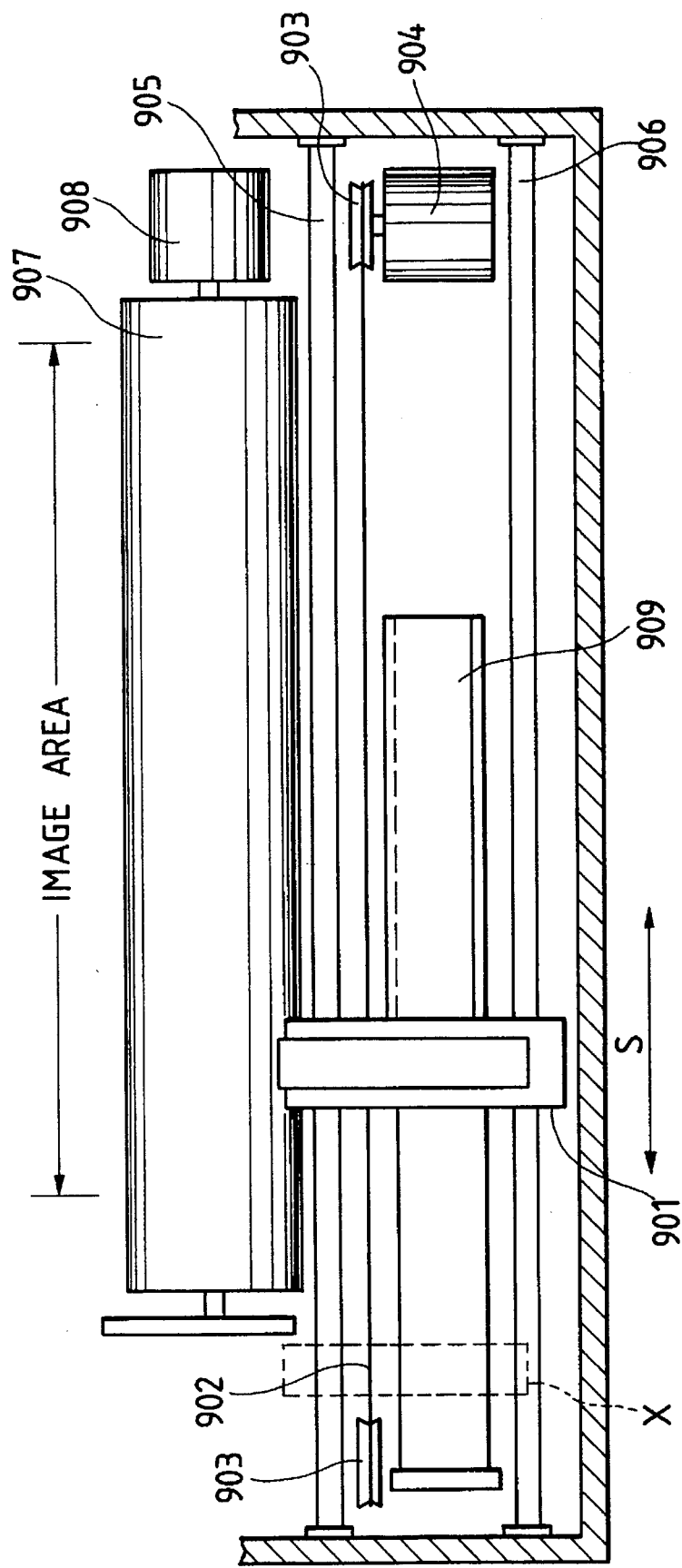
FIG. 5 is a sectional view showing the principal constitution of the recording device of the first example of the present invention.

FIG. 5 shows the principal constitution of the recording device of the first example of the present invention. In FIG. 5, 901 is a carriage for mounting a recording head, and scanned in the direction shown by the arrowhead S in the Figure. 902 is a wire on which the carriage 901 is secured and also spanned by the pulleys 903 provided at the both ends of the moving range of the carriage 901.

Motor 904 serves as the carriage driving source which is joined to one of the pulleys 903 and scans the carriage 901 in the S direction in the Figure by rotating the pulley 903. 905 and 906 are the first and second guard rails for guiding the carriage 901 by extending toward the above-mentioned S direction.

907 is a platen roller for regulating the face to be recorded of a recording medium such as paper, film, etc. and also conveying the recording medium. 908 is a motor which drives with the platen roller 907 and rotates the platen roller 907 during conveying of the recording medium.

909 is a cable for transmission of control signals, of which one end is mounted on the carriage 901, the other end connected to the control circuit as described below, and performs transmission of image data, control signals and other signals between the control circuit and the carriage 901.

The cable 909 is made to have a form of a flexible cable so as to follow the displacement of the carriage 909. X is the position where the head performs black discharge, and generally provided at the position away from the image region 9.

Next, the discharge principle of bubble jet is described briefly by referring to FIG. 6. In FIG. 6, under the state (1), the meniscus position of ink exists at around the discharge opening. On one surface of the ink discharge pathway is arranged a heater, and during recording, current is passed through the heater to heat the ink by an abrupt temperature elevation exceeding nucleus boiling to effect film boiling. Then, as shown in the state from (3) to (7), a bubble is formed within the ink and the ink is discharged to outside through the expansion force of the bubble.

Figure 7A:
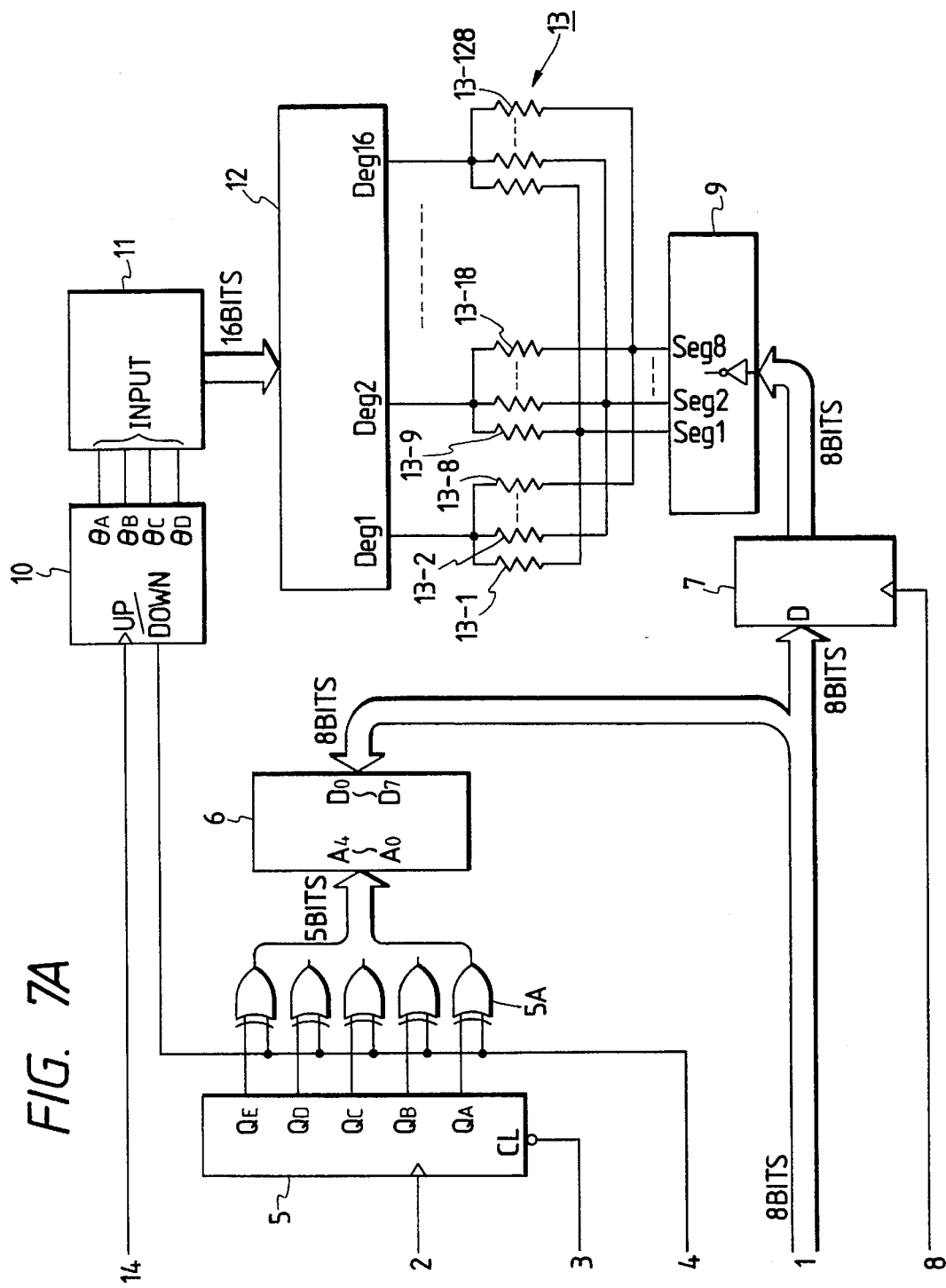
FIG. 7A is a block diagram showing the circuit constitution of the first example of the present invention and FIG. 7B its flow chart.

Next, the constitution of the control circuit which performs recording control of recording head is shown in FIG. 7A.

In FIG. 7A, 1 is image data which designates whether dot recording is performed or not corresponding to the respective dot positions, and is inputted as synchronized with the image clock 2 of a certain period. VE (video enable) 3 is an information signal which designates the effective region of image. 4 is a change-over signal, which a signal designating the change-over between going way recording and returning way recording which is the key point of the example to which the present invention has been applied.

5 is an address counter which forms reading and writing addresses of the memory 6 by counting the image clock 2.

The output of the address counter 5 is address inputted into the memory 6 after the logic operation of EXCLUSIVE.OR with the change-over signal 4. 6 is a memory as the memory means for storing temporarily the image data to be recorded and is constituted of imaged data of 8 bits per one address. In this example, one block is constituted of 8 recording elements (heaters), and performs time division driving for 16 blocks, and image data corresponding to 8 per one block are housed in one memory address.

7 is a latch circuit for holding the output data of the memory 6 at a timing of a data latch pulse 8. 9 is a segment circuit which generates driving currents corresponding to the heaters 13-1 to 13-128 by amplification of the output signals of the latch circuit 7, and a transistor array is used therefor.

10 is a counter as the designation means which designates the heater heating order at the block unit, counts the clock signals 14 and designates the block to be heated depending on the counting result. For the counter 10, an up-down counter of 4 bit capable of counting the 4 bit output in ascending order and descending order is used; and counting in ascending order or descending order is determined depending on the change-over signal 4 as described above.

12 is a digit circuit which grounds selectively the 8 current passage wires to which the respective heaters within the block are connected in parallel for each block, and passes current through the heater within the block selected, and successively select the block to be energized with current in the counting order of the 4 bit counter 10.

11 is a decoder which decodes the counted value of the 4 bit counter 10, thereby converting it to the designation signal for the digit circuit 12.

13 is a group of heaters consisting of 128 heaters, and these heaters are arranged in a row so as to assume a constant angle relative to the main scanning direction as shown in FIG. 2A. The respective signals 1, 3, 4, 8, 14 inputted into the main control circuit are well known in the device of the prior art and detailed description thereof is omitted here.

Figure 7B:
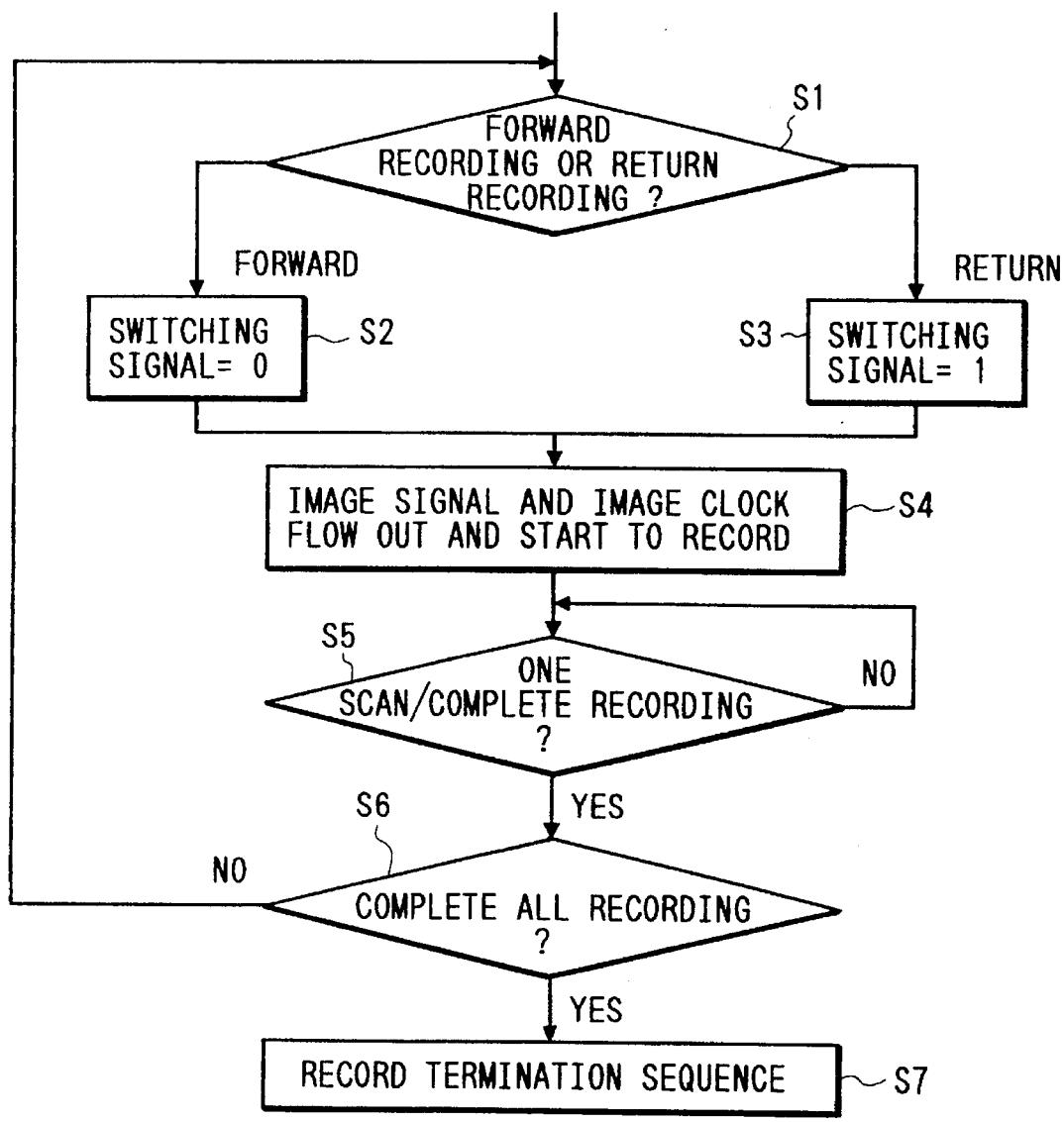
Figure 8:
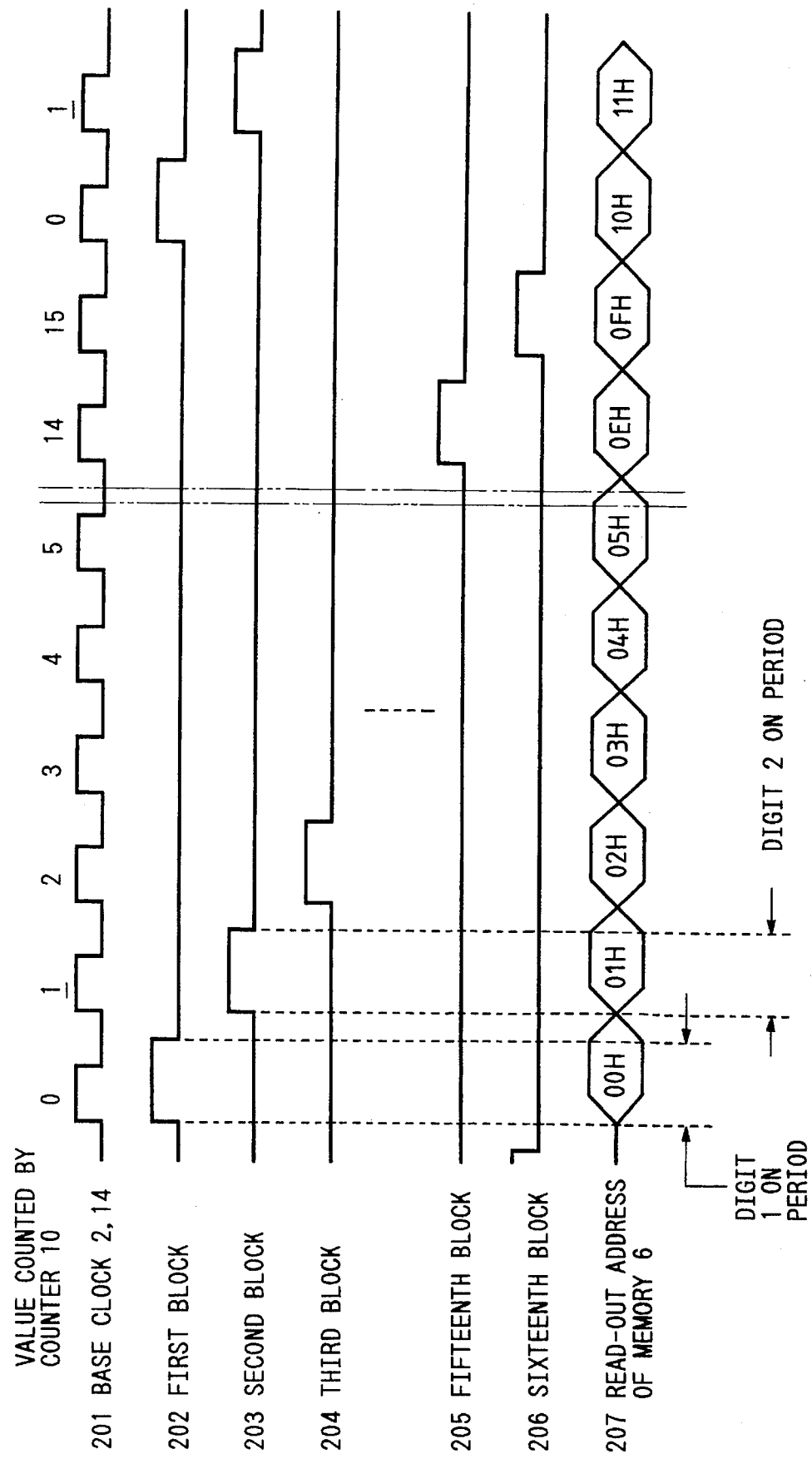
FIG. 8 is a timing chart showing the actuation timing of the going way recording of the first example of the present invention.
Figure 9:
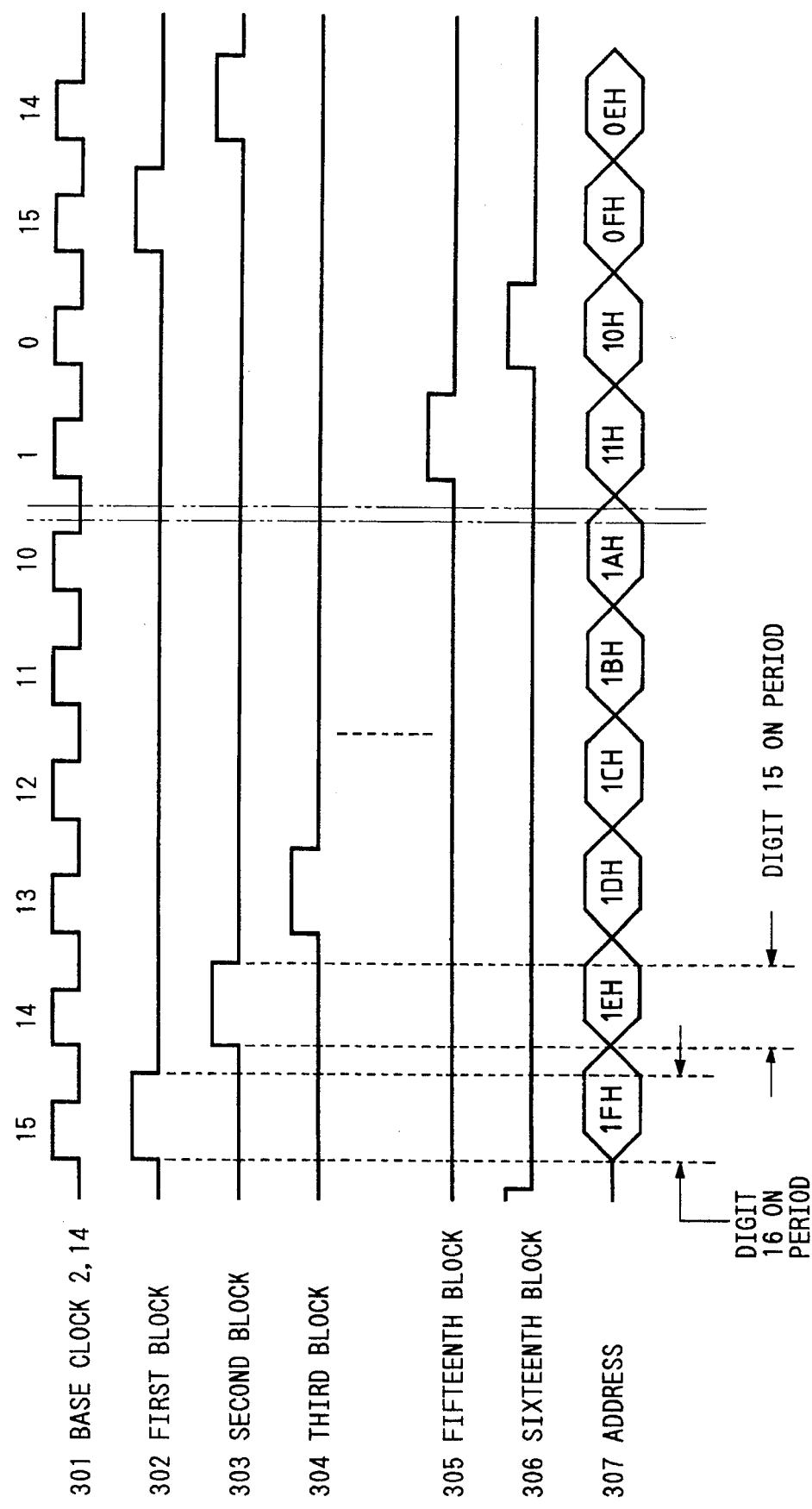
FIG. 9 is a timing chart showing the actuation timing of the returning way recording of the first example of the present invention.

Next, the actuation in recording in the circuit shown in FIG. 7 is described by referring to FIG. 8 and FIG. 9. FIG. 8 shows an actuation timing during going way recording, and FIG. 9 an actuation timing during returning way recording.

When the change-over signal 4 of the bit "0" indicating going way recording is generated by the central processing unit (CPU) which controls the whole control of the recording device, the gate of the EXCLUSIVE.OR circuit 5A is opened, and the output of the address counter 5 is inputted as such into the memory 6. At the same time, the counter 10 is set with up-count (ascending order count) by the change-over signal 4. At this time, it is supposed that, in the memory 6, image data to the 128 heaters 13-1 to 13-128 are successively stored with, for example, the image data of the first block being as the address "00H".

Both of the address counter 5 and the counter 10 initiate counting in the order of (decimal number) . . . at the same timing. When the above counting number is "0", the circuits of the heaters 13-1 to 13-8 of the first block takes the state capable of current passage (on) by the digit circuit 12, whereby the image data stored in the address "00H" of the memory 6, namely the image data whether heaters 13-1 to 13-8 are to be subjected to current passage or not, are outputted into the segment circuit 9. In the segment circuit 9, driving current corresponding to the image data is applied to the first to the eighth heaters within the first block to heat the predetermined heaters, thereby effecting dot recording. Subsequently, every time when the counting values of the address counter 5 and the counter 10 become "1", "2" (decimal number) . . . , the heaters of the second block, the third block correspond thereto to effect heating.

When all dot recording of one row is completed, the 4 bit counter 10 is reset. When dot recording corresponding to two rows is completed, the memory contents in the memory 6 are renewed to the image data corresponding to the next two rows, and recording is performed according to the same procedure as described above.

Next, during returning way recording, when the change-over signal is set at the bit "1" by CPU, the output of the address counter 5 is reversed by the EXCLUSIVE-OR circuit 5A in the next step to be inputted into the memory 6. For example, when the output value "0" (decimal number) of the address counter is reversed, the input value of the memory becomes "31" (decimal number). At the same time, down-count is selected for the counter 10. In the memory 6, it is supposed that dot data corresponding to 2 rows for returning way recording are housed at the addresses "00H"–"1FH" made correspondent to the positions of the first to the 16th blocks.

The counter 10 initiates counting from "15" (decimal number). Accordingly, the heaters of the 16th block can be energized with current, and image data stored in the address "1FH" of the memory 6 are output into the segment circuit 9. Next, by renewal of the counting values of the counters 5, 10, the image data of the address "1EH" of the memory 6 are outputted into the segment circuit 9. When the image data is outputted into the segment circuit 9, the digit 15 of the digit circuit 12 is turned on, whereby current passage through the heaters of the 15th block becomes possible, and the predetermined heaters are heated based on the image data.

As described above, by permitting time division recording of a plurality of recording elements (heaters) arrayed in a row in the block order opposite to going way recording to be performed, the recording result becomes such that the dot images for each block are arrayed in a row similar to as going way recording as shown in FIG. 2B.

Here, by use of FIG. 7B, the recording sequence of this example is described.

First, in the step S1, it is judged whether recording is going way or returning way recording. If it is going way recording, "0" is outputted as the change-over signal 4 (step S2), or if it is returning way recording, "1" is outputted as the change-over signal 4 (step S3). Next, in the step S4, recording is initiated by receiving the image signal 1 and the image clock 2. Next, it is judged whether one recording scan has been completed or not (step S5), and whether the whole recording has been completed or not (step S6), and if the whole recording has been completed, the recording completion sequence is performed to complete recording (step S7).

In addition to the first example to which the present invention has been applied as described above, the following application examples may be conceivable.

Figure 10:
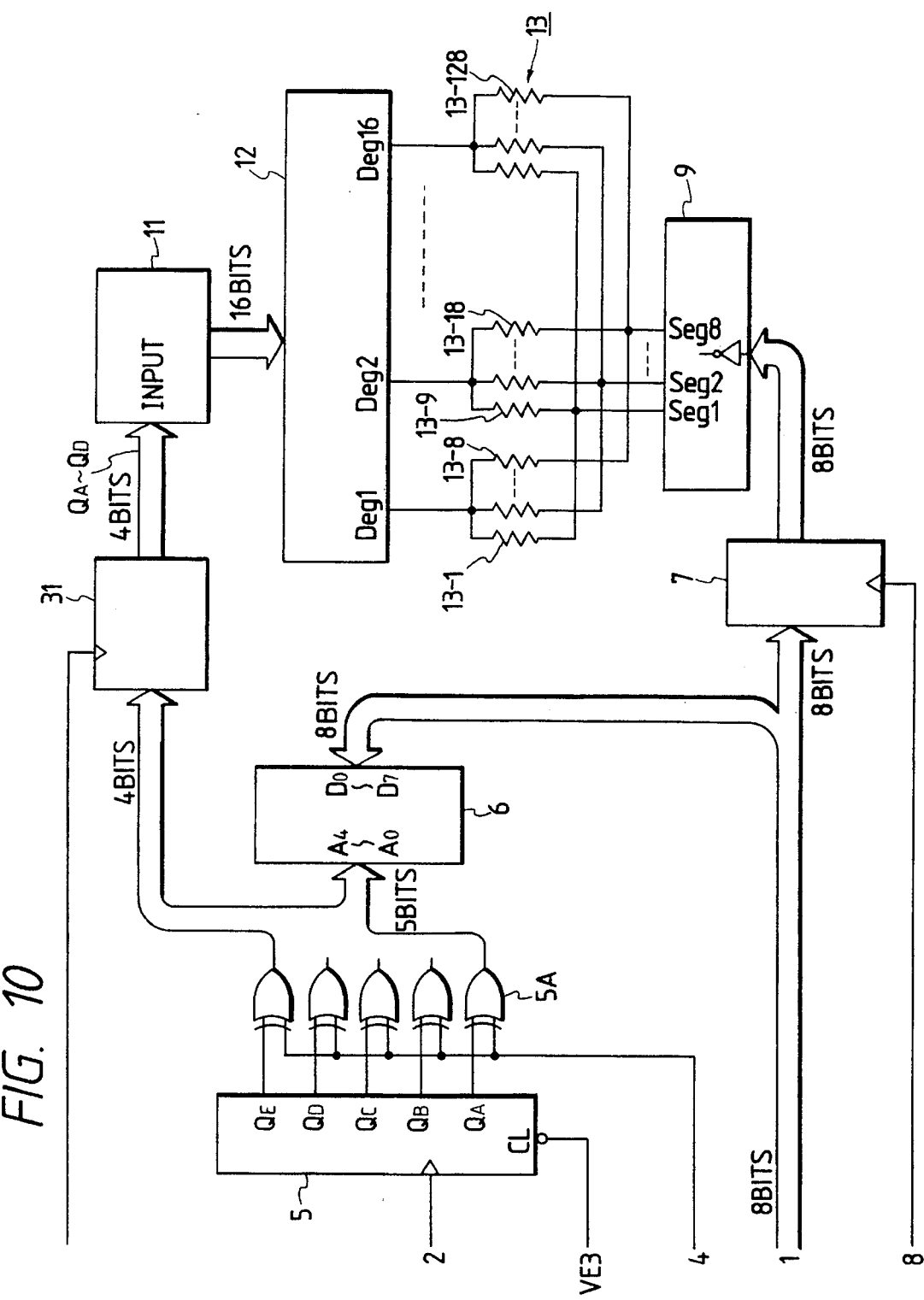
FIG. 10 is a block diagram showing the circuit constitution of the second example of the present invention.

1) In the first example, separate counters 10, are used for the digit circuit 12 and the memory 6, but one counter can be also commonly used. In this case, as shown in FIG. 10, the lower 4 bits of the EXCLUSIVE-OR circuit 5A are inputted into the decoder 11. Benefits of this example, miniaturization and cost reduction of the instrument due to circuit reduction can be obtained.

On the other hand, this example may be limited in expansion of the function which enables setting of the start position for driving the digit freely by addition of a preset function on the counter 10 shown in FIG. 7. Therefore, the first example and the second example may be used distinguishedly as desired.

Figure 11:
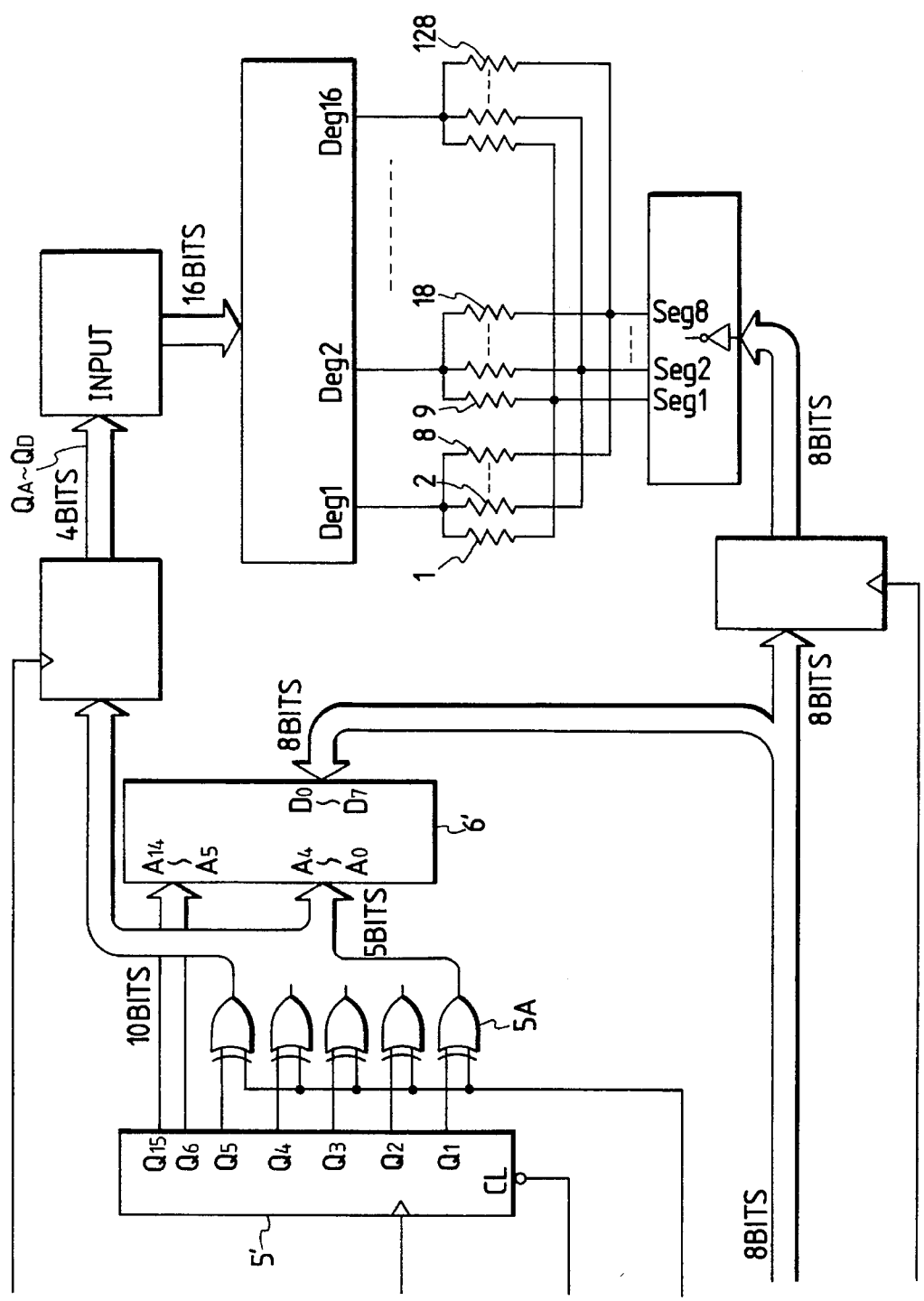
FIG. 11 is a block diagram showing the circuit constitution of the third example of the present invention.

2) In the above second example, an example of performing image recording only of black color has been shown, but when the present invention is applied to a color recording device, further the following advantage can be brought about. That is, since a plural number of recording sections exist for the respective colors, a memory for storing temporarily image data is provided for correcting the time slippages of color recording for separate colors. By reversing the order of reading of image data in going way recording and returning way by use of this memory, memory can be saved. In this case, an address counter 5' of 15 (5×3) bits is prepared as shown in FIG. 11, the address is inputted into the memory 6' through EXCLUSIVE-OR circuit 5A which performs operation of exclusive logic sum of the lower 5 bits and the change-over signal within the address space, and the upper 10 bits are address inputted as such into the memory 6'.

As described above, the above first mode calls attention to the fact that no recording slippage occurs if recording is performed in returning way recording in the block order opposite to going way recording, sets the designation means so that the designation order of the blocks for performing recording practices the invention in returning way recording, and also reverses the reading order of the image data of the memory means, whereby the image data to be recorded can be also supplied to the recording section of the above blocks in correspondence to the above block positions. As the result, returning way recording in the block order opposite to going way can be accomplished.

Also, in the above-described second mode, since the address designation order of returning way recording is reversed by reversing the generated address of the address counter by a logic circuit, the number of the counter can be made one without preparation of address counters which generate addresses of ascending order and descending order, respectively.

Further, in the above-described third mode, since one up-down counter is used as the designation means, the block designation of ascending order and descending order can be done with one counter, this can contribute to miniaturization of the device.

In the above-described fourth mode, since the block designation and the reading address of memory means are set on the basis of the output valve of the counter by calling attention on the fact that the designated blocks and the housing addresses of the image data of the recording means are in corresponding relationship, the number of the counters needed is only one, which can contribute to miniaturization of the device.

Further, in the above-described fifth mode, since returning way recording is performed in the block order opposite to going way recording, the recording order of the image data stored in the memory means and the order of driving block are made reversible, whereby returning recording is rendered possible and returning way recording results become also of the same quality as going way recording.

Further, another example is to be described. The example as described in the following is an image processing device, having an input means for inputting successively and repeatedly image data of color components synchronized with a predetermined clock, a memory means which stores the above image data at a given address, a generation means for generating the above address as synchronized with the above predetermined clock, said address generating means being a means for generating the bit exhibiting the above color component as the upper bit of the above address.

Further, it is an image recording device which reads the recorded image data for respective colors from the memory for storing recorded image data and recording the image with a carriage mounted with recording heads for respective colors spaced at predetermined intervals in the main scanning direction, which is equipped with an input means which inputs successively the image data for the respective color components as synchronized with a predetermined clock, an address generation means which generates an address with a bit number corresponding to the address space of the above memory, an address converting means which exchanges at least the bit number corresponding to the recorded color number from the lower position of the address generated at said address generation means with the remaining upper address bit group to supply it to the above memory, and a writing means for writing the image data inputted by the above input means at the address position of the above memory supplied by said address converting means.

In describing this example, FIG. 5 and FIG. 6 as described above are employed. However, in this example, the above-described carriage 901 has heads (901A–901D) corresponding to the respective colors of cyan (hereinafter C), magenta (hereinafter M), yellow (hereinafter Y) and black (hereinafter K) mounted thereon.

Figure 12:
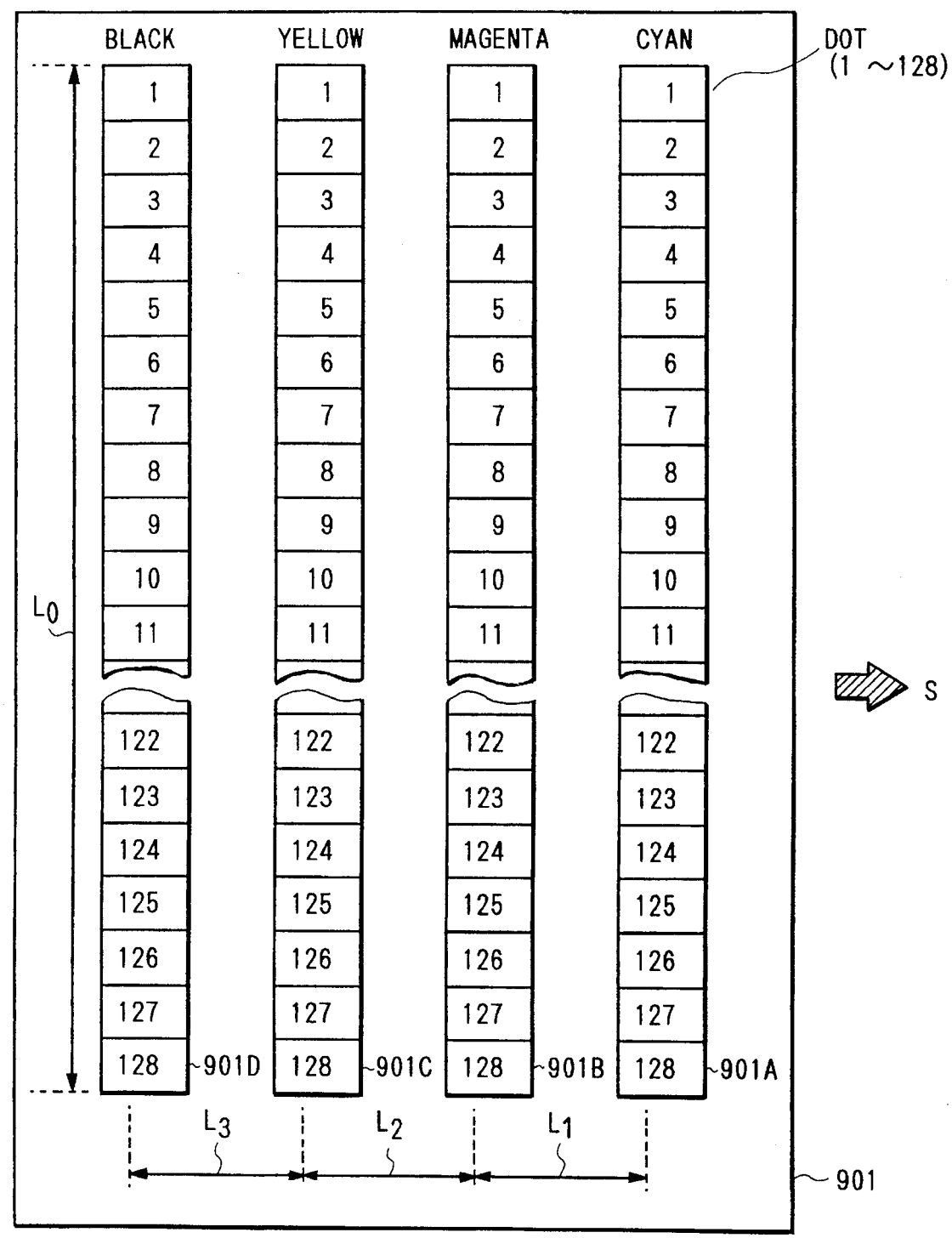
FIG. 12 is an illustration showing the constitution of the carriage of another example to which the present invention is applied.

Here, the structure of the carriage 901 is shown in FIG. 12.

As shown in the Figure, in the carriage 901 are assembled writing heads (901A–901D) of the total four colors of C, M, Y, K. In the case of this example, each head has ink projection openings corresponding to 128 dots, which are arrayed in a row with the intervals $L_1$, $L_2$, $L_3$ between the respective heads. That is, it is shown that the respective 128 dots of the four colors can be printed by one scanning movement in the S direction (scanning direction).

Now, when a printer having a printing density of 400 dpi is considered, in the example of a printing head having 128 dots as one line, its printing width $L_0$ becomes about 8 mm.

In this example, 128 ink projection openings as shown in FIG. 6 are arranged in number of 128 for each head of C, M, Y, K in the constitution of FIG. 5.

Figure 13:
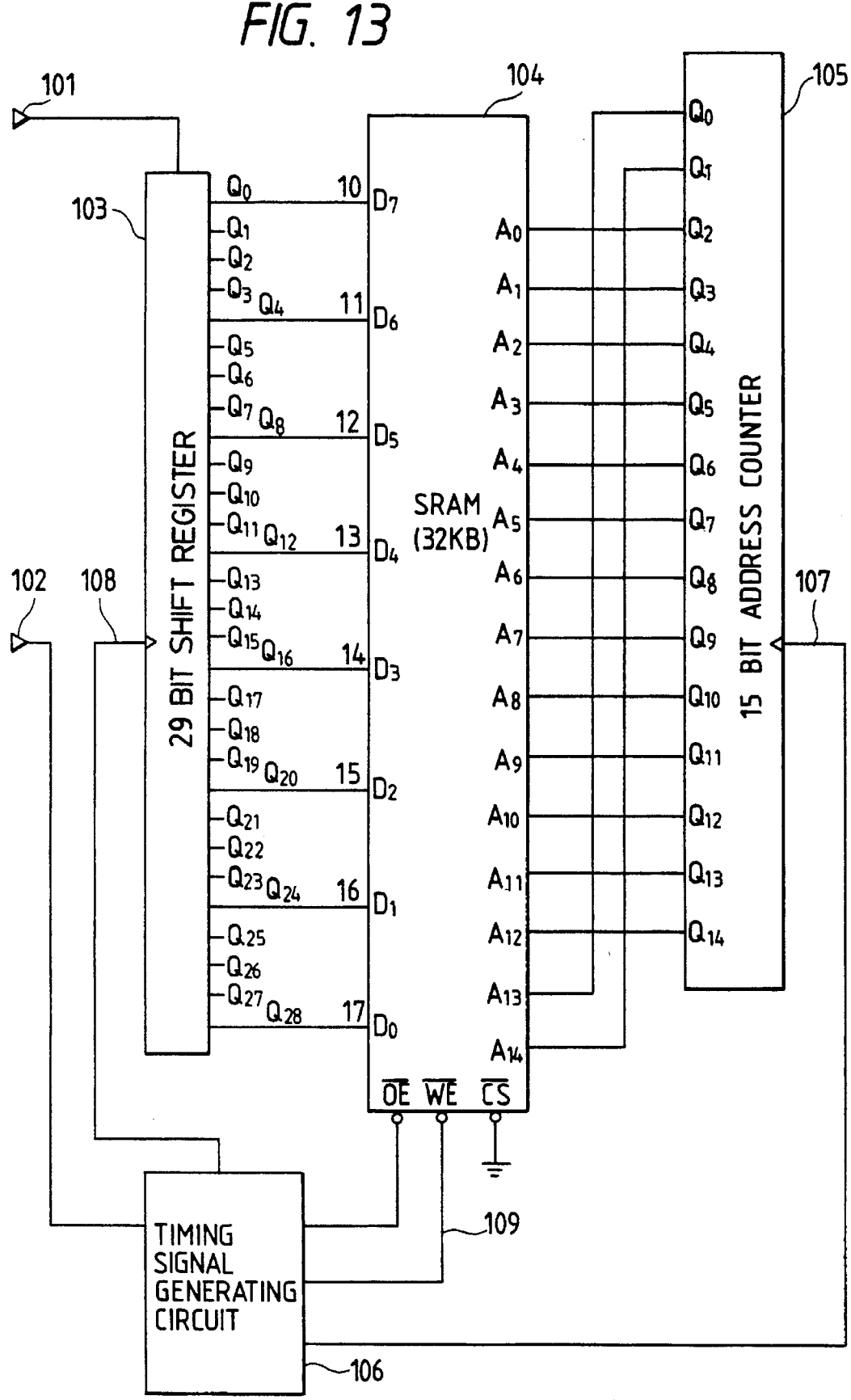
FIG. 13 is an illustration showing the circuit constitutions from inputting of image data to writing into memory in this example.
Figure 14:
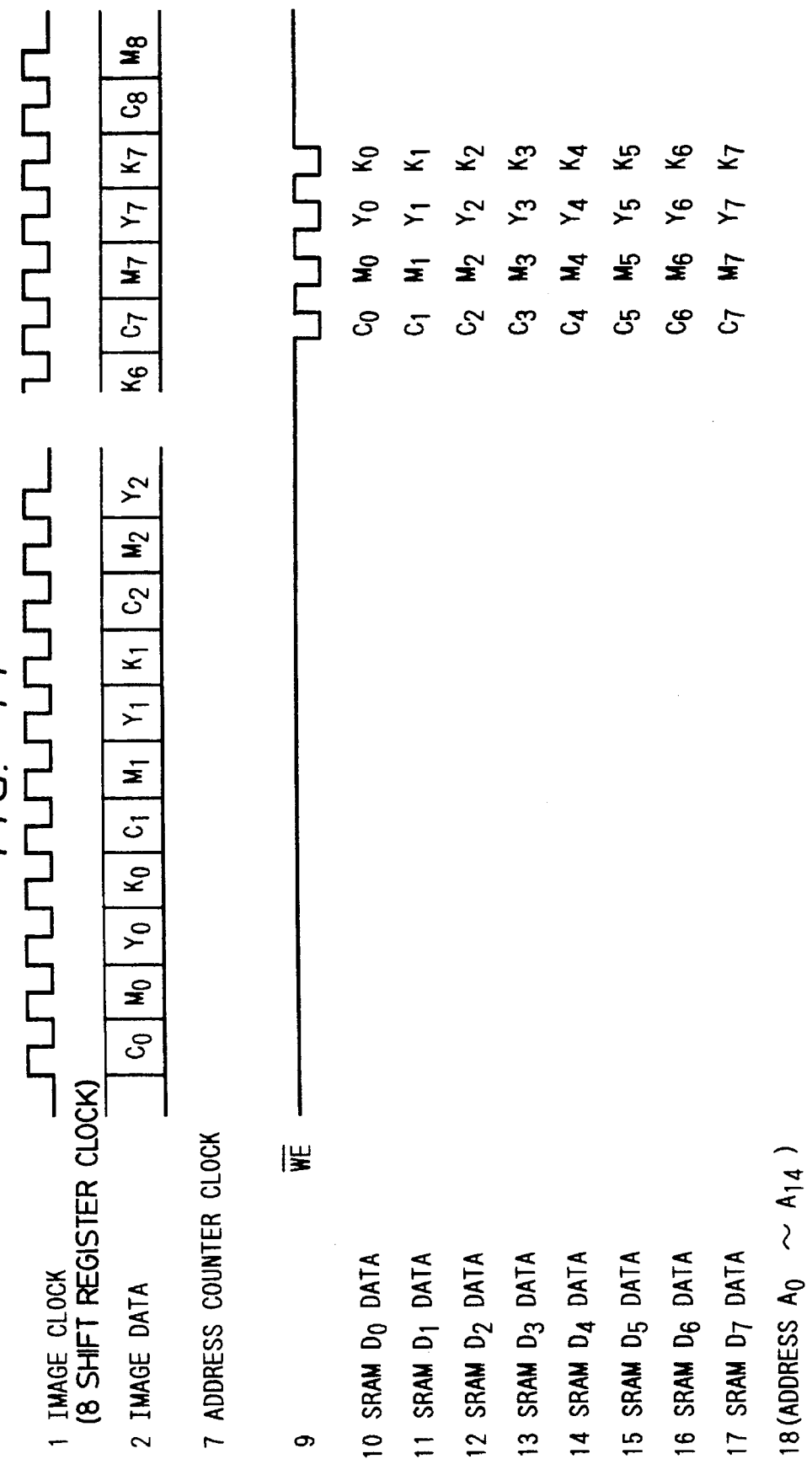
FIG. 14 is a timing chart for illustration of the actuation of the respective circuit constitutions in FIG. 13.
Figure 15:
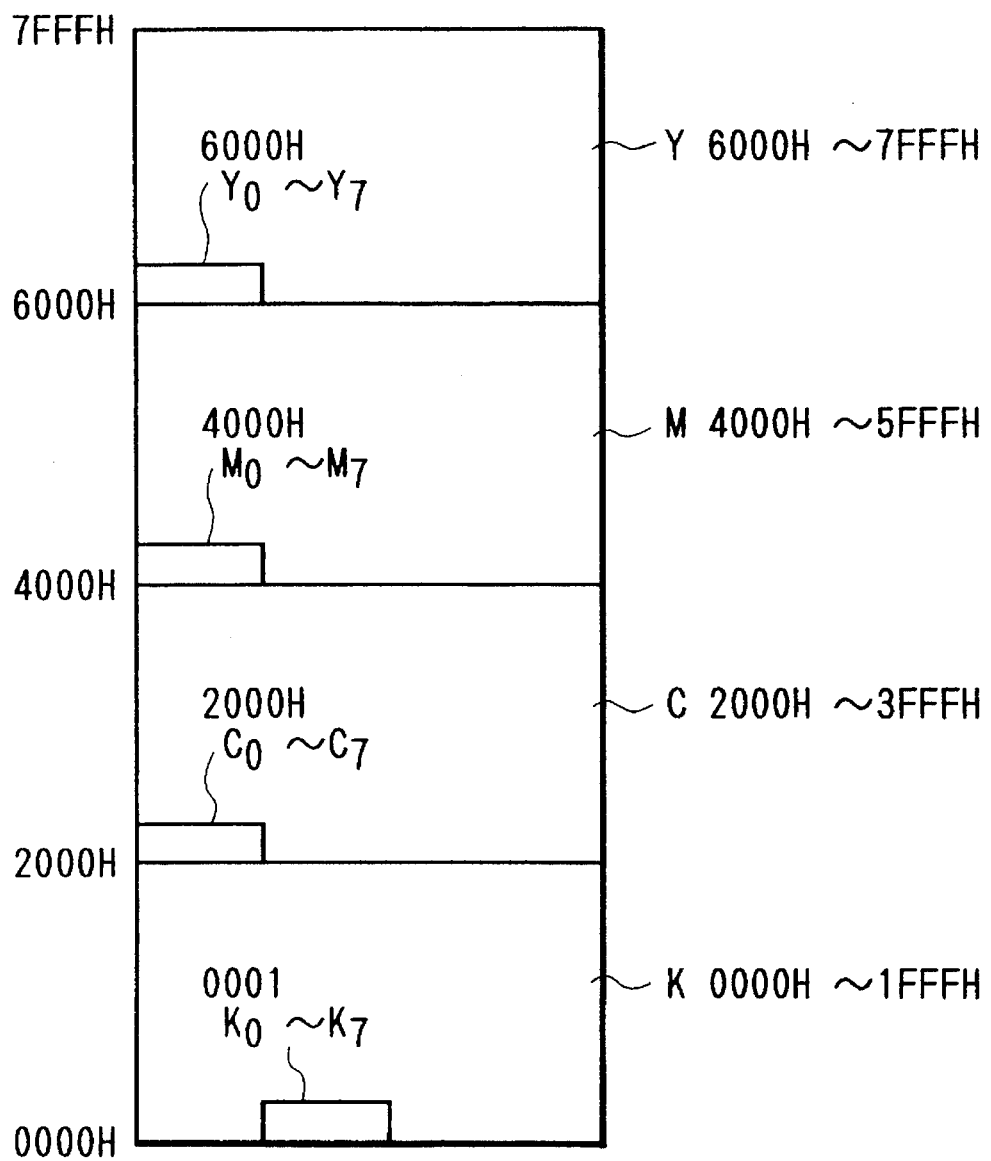
FIG. 15 is an illustration showing the memory space of RAM and memory regions for respective colors in FIG. 13.

Referring now to FIGS. 13–15, the outline of the processing according to housing of the image data of this example in the constitution of the recording system as described above is to be described.

In the example, it is supposed that the data for the respective data are sent serially one bit by one bit in the order of C, M, Y, K, C, M . . . Also, description of the operations by use of known techniques about driving of practical recording heads is omitted.

Now, in FIG. 13, the serial data 101 sent in the form as mentioned above is incorporated in a 29-bit shift register 103. Of the outputs of the 29-bit shift register 103, those corresponding to the total 8 bits of $Q_0$, $Q_4$, $Q_8$, $Q_{12}$ . . . $Q_{28}$ are outputted to the writing data bus to SRAM 104 (in the example, the capacity is 32 KB=32×1024 byte). That is, for SRAM 104, since the bits of the serial data for every four bits are inputted into the data input terminals $D_0$–$D_7$, the data under the state separated for respective colors are inputted.

On the other hand, the counter values $Q_0$–$Q_{14}$ of 15 bits formed in the address counter 105 are, as shown in the Figure, have $Q_0$ connected to the SRAM address bit $A_{13}$, $Q_1$ to $A_{14}$, and sequentially from $Q_2$ to $Q_{14}$ to the address bits $A_1$ to $A_{12}$.

Although the description is not in order, the 29-bit shift register 103, SRAM 104 and the 15-bit address counter 105 are actuated as synchronized with the clock outputted from the timing formation circuit 106.

In the following, actuation of these respective elements are described on the basis of the timing chart shown in FIG. 14.

The image data 101 are inputted in the order of C, M, Y, K as synchronized with start-up of the image clock 102 as described previously. Now, suppose that the initial image data are made $C_0$, $M_0$, $Y_0$ and $K_0$, then when the eighth picture elements $C_7$, $M_7$, $Y_7$, $K_7$, namely the data corresponding to 8 bits for the respective colors are inputted, the address counter, the shift register, WE (write enable) become active, whereby the data are written into SRAM 104.

The written data and the address thereof for the SRAM 104 at this time are as shown in 10–18 in FIG. 14.

To describe in more detail, the outputs $Q_0$–$Q_{15}$ of the 15 bit address counter 105 at the respective timings when WE signals become active are $0001_H$, $0002_H$, $0003_H$, $0004_H$ (H shows hexadecimal number). However, since the connection between the 5-bit address counter 105 and the address of SRAM 104 is in the relationship as previously described (shown in FIG. 13), the address for SRAM 104 becomes $2000_H$, $4000_H$, $6000_H$ and $0001_H$.

In other words, to describe in the memory space of SRAM 104, as shown in FIG. 15, the region of the address of 32 KB space "$0000_H$–$1FFF_H$" becomes the K region, the address "$2000_H$–$3FFF_H$" the C region, the address "$4000_H$–$5FFF_H$" the M region, and the address "$6000_H$–$7FFF_H$" the Y region.

Thus, the data of picture elements of the respective colors sent as the serial data can be housed in byte units in SRAM 104. When the memory has become full of data, for example, when Y data is written in $7FFF_H$ address, next writing is newly done from the address $6000_H$.

As described above, according to this example, it becomes possible that multi-color serial data are to byte to byte data separately for respective colors with a simple constitution, and the byte data of the respective colors are housed while being allotted in one memory.

In this example, description has been made about the case when the serial data are received, they are converted to byte data and stored by allotment into one RAM, but the present invention is not limited only to this case.

This is because, for example, the input interface may not be serial but parallel. Of course, in this case, it is required to receive the parallel data for the respective colors.

Also, in this example, the memory capacity allotted for the respective colors is made 8 Kbytes, but also the present invention is not limited thereby. For example, when the recording density with the recording head is high and a RAM having large capacity is required, for example, a RAM of about 64 Kbytes is employed, by connecting the lower 2 bits of the address counter (16 bit output) to the upper position of the address of RAM, the memory capacity allotted for the respective colors can be increased to two-fold of 16 Kbite.

As described above, according to this example, the color image data inputted repeatedly are stored in the different areas of the recording means for the respective color components. Further, for such memory, according to this example, the bits exhibiting the color component are generated as the upper bits of the memory means and therefore the above-described function can be realized with a simple constitution.

Further, according to this example, since the circuit construction from image data receiving to housing of memory becomes simple, the size of the device can be reduced, and also cost-reduction can be effected.

Also, when the picture element data for the respective colors are sent serially, they are converted into bit unit data for the respective colors, and address and writing signals are generated in effecting the conversion. By this, even when serial data may be inputted, it becomes possible to allot the data of bit units for the respective colors in the memory with a simple constitution and surely.

Still another example is described below.

The device constitution in this example is the same as in the example described above by use of FIG. 12–FIG. 15, and FIG. 5, FIG. 6 and FIG. 12 are employed here.

The outline of the control system in color printing of this example in the constitution of the recording system as mentioned above is described.

Figure 16:
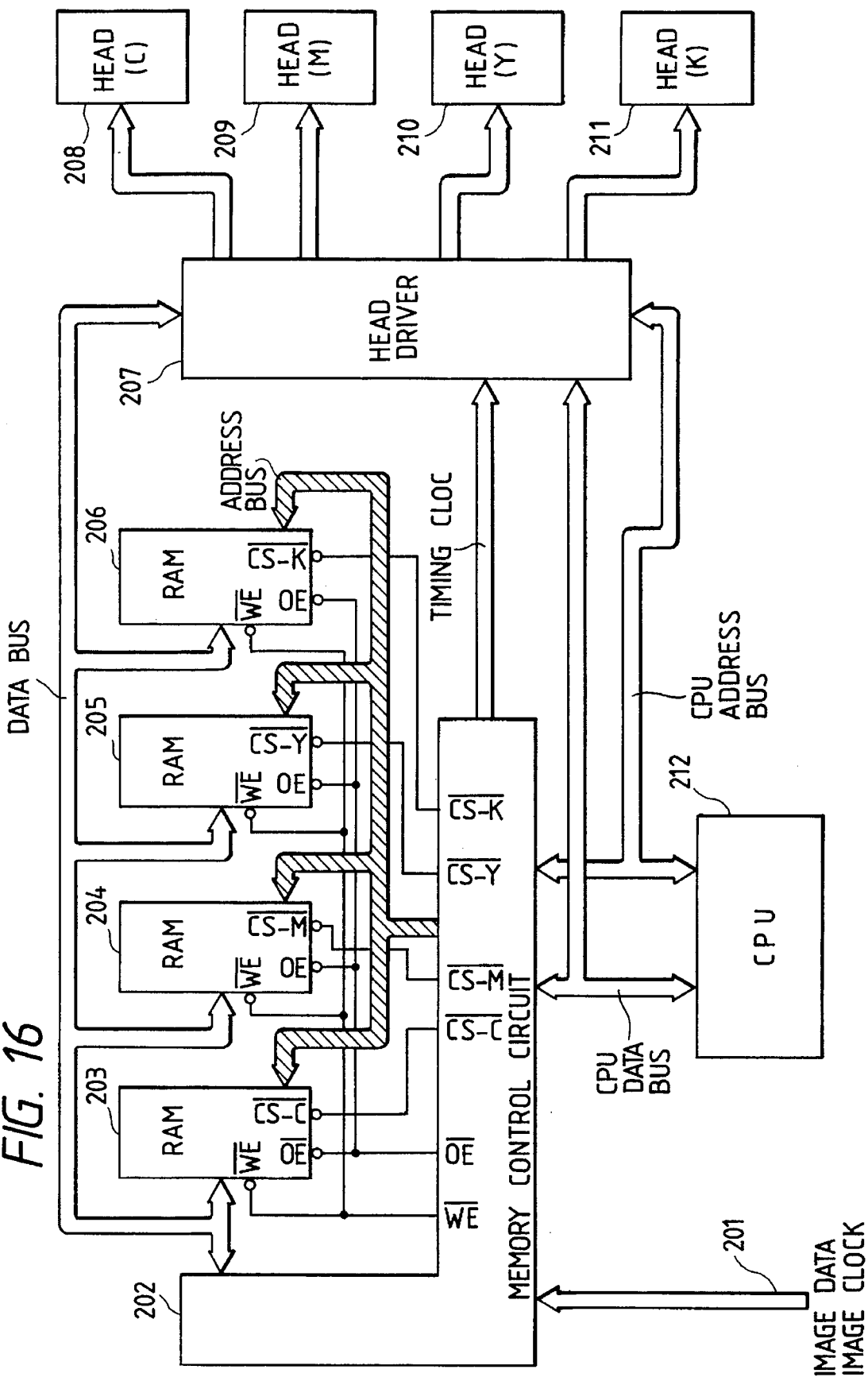
FIG. 16 is a block diagram of the control system of the bubble jet printer in another example to which the present invention is applied.

First, in FIG. 16, the image data 201 sent to this device are separated by a memory control circuit 202 for respective colors and respective signals and written in RAM 203–206. Here, RAM 203–206 correspond to the respective colors of C, M, Y, K as a matter of course. And, the data developed within RAM 203 are sent through a head driver 207 to a cyan head 208. Also, the data of RAM 204 are sent to a magenta head 209, the data of RAM 205 to a yellow head 210 and data of RAM 206 to a black head 211, respectively, through the head driver 207. Writing and reading of the data into the respective RAM are all performed in the memory control circuit 202. The memory control circuit 202 is controlled by the image data 201 and the signals from CPU 212, and may be also formed into one LSI chip, including the gate array, etc. CPU 212 is connected in addition to data bus, address bus shown in the Figure, to control lines such as read, write signals, etc. (although not shown here). Head drive 207 is similarly joined. However, since the head driver 207 drives the ink jet head, it includes a power circuit, but this is not directly related to the present invention and its description is omitted.

Now, having described the printing carriage 901 (having the cyan head 208, the magenta head 209, the yellow head 210 and the black head 211 mounted thereon) in this example, if the data of C, M, Y, K are printed at the same time, the color slippages between C-M, C-Y, C-K are formed with the respective sizes of $L_1$, $L_1+L_2$ and $L_1+L_2+L_3$.

Accordingly, color slippage is correctted by varying the timing for reading of the data of RAM 208–206.

The timing is shown in FIG. 7, and from the start-up of the start signal, the printing timing of the respective colors is varied from $t_1$ to $t_4$.

Here, the printing timings for the respective colors are portions of $t_5$–$t_8$ shown by slash lines.

Generally, it is controlled so that they may be:

$t_5=t_6=t_7=t_8,$ $t_2-t_1=L_1/V,$ $t_3-t_2=L_2/V,$ $t_4-t_3=L_3/V.$

"V" is the speed of the carriage 901 when moving in the S direction.

Whereas, in this example, when monochromatic printing is performed with only black, the ink cartridges connected to the printing heads 208–211 are all exchanged with those for exclusive use of black (when head and ink cartridge are integrated, it may be exchanged).

And, the monochromatic image data 201 are divided by the memory control circuit 202 into the respective data of 128, and the first 128 data are housed into RAM 203, the next 128 data into RAM 204, the next 128 data into RAM 205, the next 128 data into RAM 206 and again the next 128 RAM into RAM 203. Here, "128" is the dot number in the sub-scanning direction which can be printed by one carriage direction shown in FIG. 5 as described above.

On the basis of such constitution, in this example, printing is performed with the scanning speed of the carriage 901 being made to 4-fold of that during multi-color printing at the maximum. That is, while the period of outputting the applied signal to the respective printing heads is the same as during multi-color printing, the four heads perform printing under divided allotments.

The outline of this monochromatic printing is described by referring to FIGS. 18A to 18E.

Figure 18A:
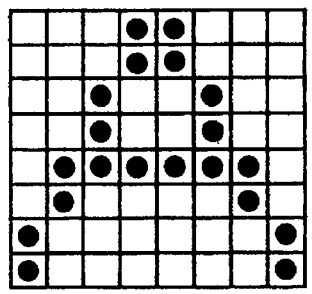
FIGS. 18A to 18E are illustrations for explaining the outline of printing during monochromatic printing.

Now, the case of printing the letter "A" in FIG. 18A is considered. For brevity of explanation, it is supposed to take one second for one line in this example. Then, in the example shown in FIG. 18A, it will take 8 seconds because there are 8 lines in all.

However, in this example, by performing printing under divided allotments with 4 heads, printing can be done substantially within 2 seconds. This is shown in FIGS. 18B–18E.

Figure 18B:
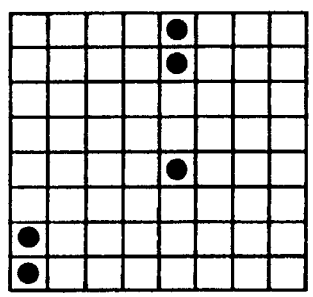
Figure 18C:
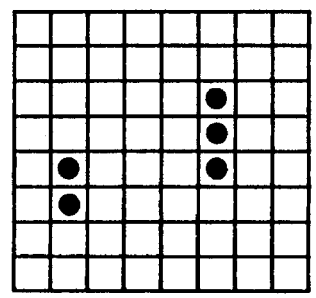
Figure 18D:
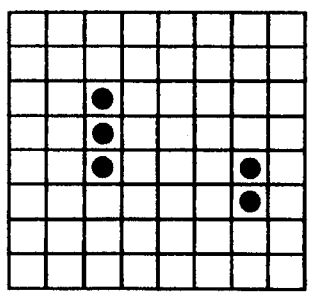
Figure 18E:
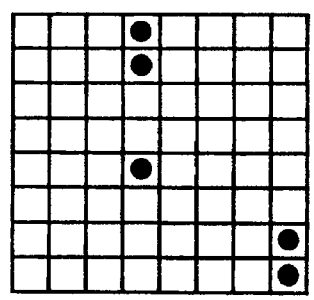

For example, FIG. 18B shows images dots printed with a head replaced for the C head 8, and FIGS. 18C–18E the image dots printed with the heads replaced for M, Y, K heads 9–11. After printing of the first one line in one second by each head, since the scanning speed of 901 is 4-fold that of a conventional one, the next dot row will be printed at 4 dot intervals.

Here, allotment of the image data into RAM 203–206 during color printing and monochromatic printing are described.

Figure 19:
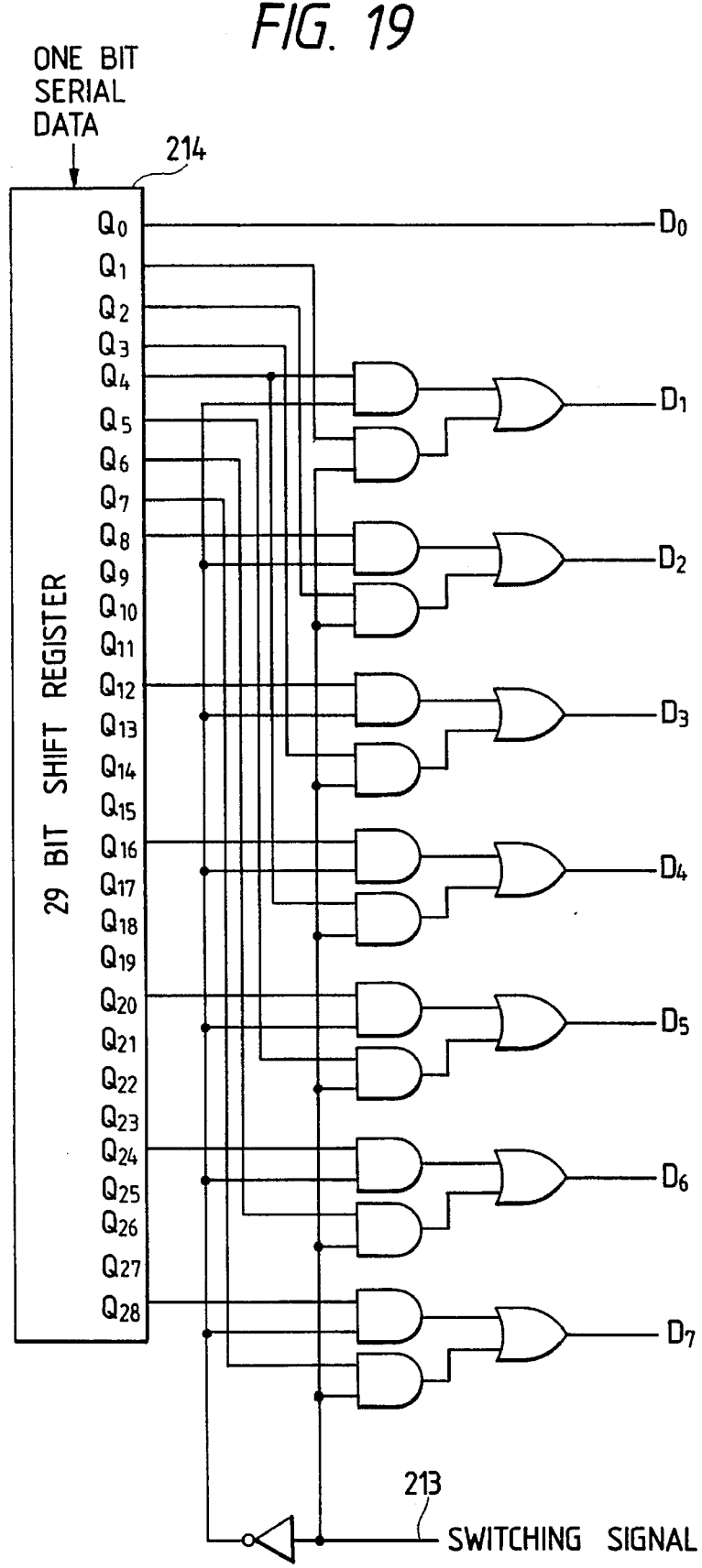
FIG. 19 is an illustration showing an example of the data allotment circuit of the memory control circuit of an example.

FIG. 19 shows a circuit constitution according to the data allotment within the memory control circuit 202 in this example.

In the Figure, 214 is a 29-bit shift registor (for example, FIFO memory). Although the description is not in order, it is supposed that during color printing, the image data are sent in respective dot informations in the order of C, M, Y, K.

Figure 20:
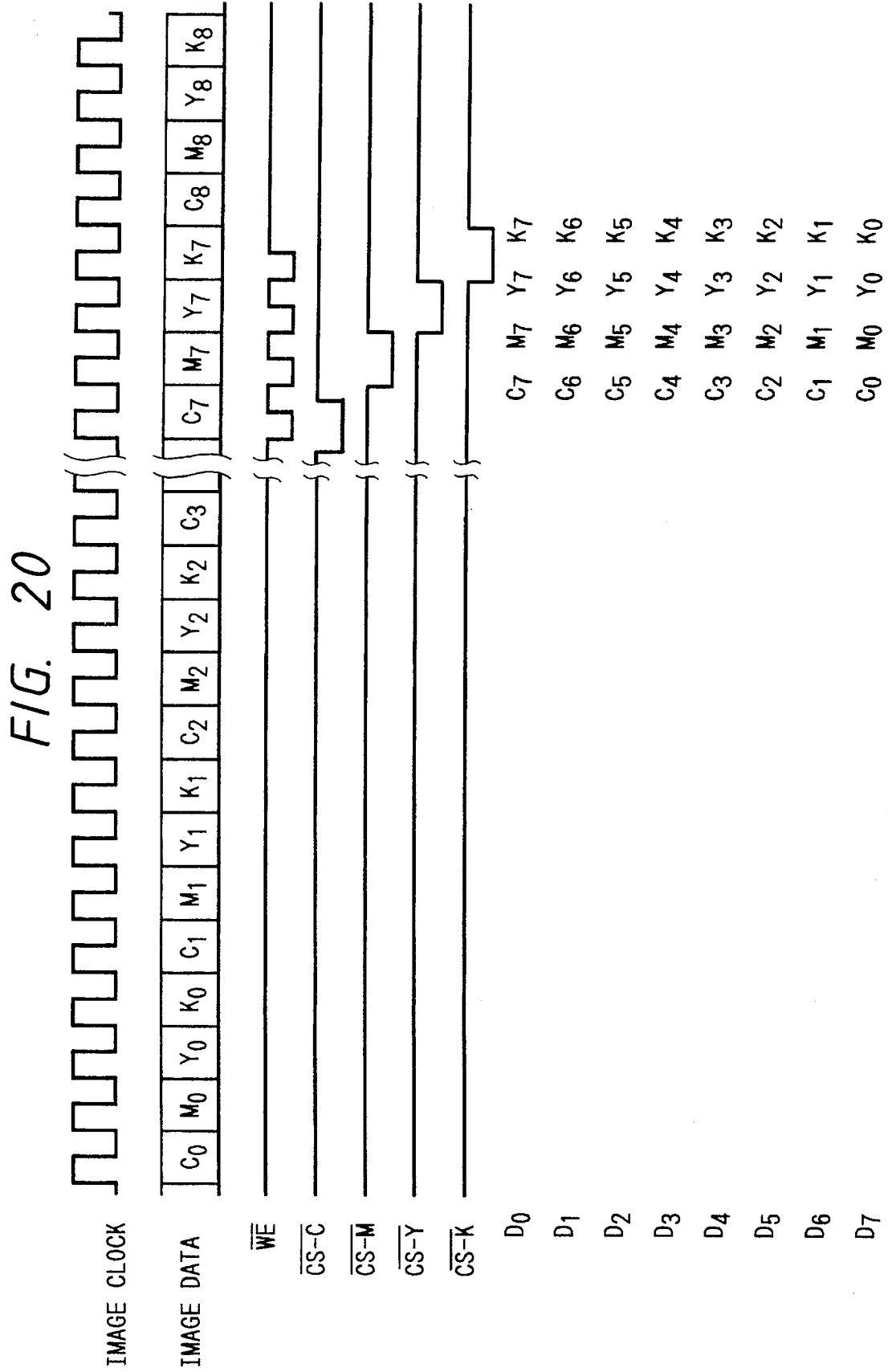
FIG. 20 is a timing chart for illustration of the allotment processing when developing the multi-color image data into RAM.

Now, when the level of the change-over signal (outputted from CPU 212) is "0", to the output lines $D_0$–$D_7$ (forming data bus) are outputted 8-bit data ($Q_0$, $Q_4$, ... $Q_{28}$) separated for respective colors. The timing chart at this time is shown in FIG. 20. The byte data for the respective colors are taken out according to the timing shown in the Figure and written in the respective RAM 203–206. At this time, as described previously, C data are written in RAM 203, M data in RAM 204, Y data in RAM 205 and K data in RAM 206.

Figure 21:
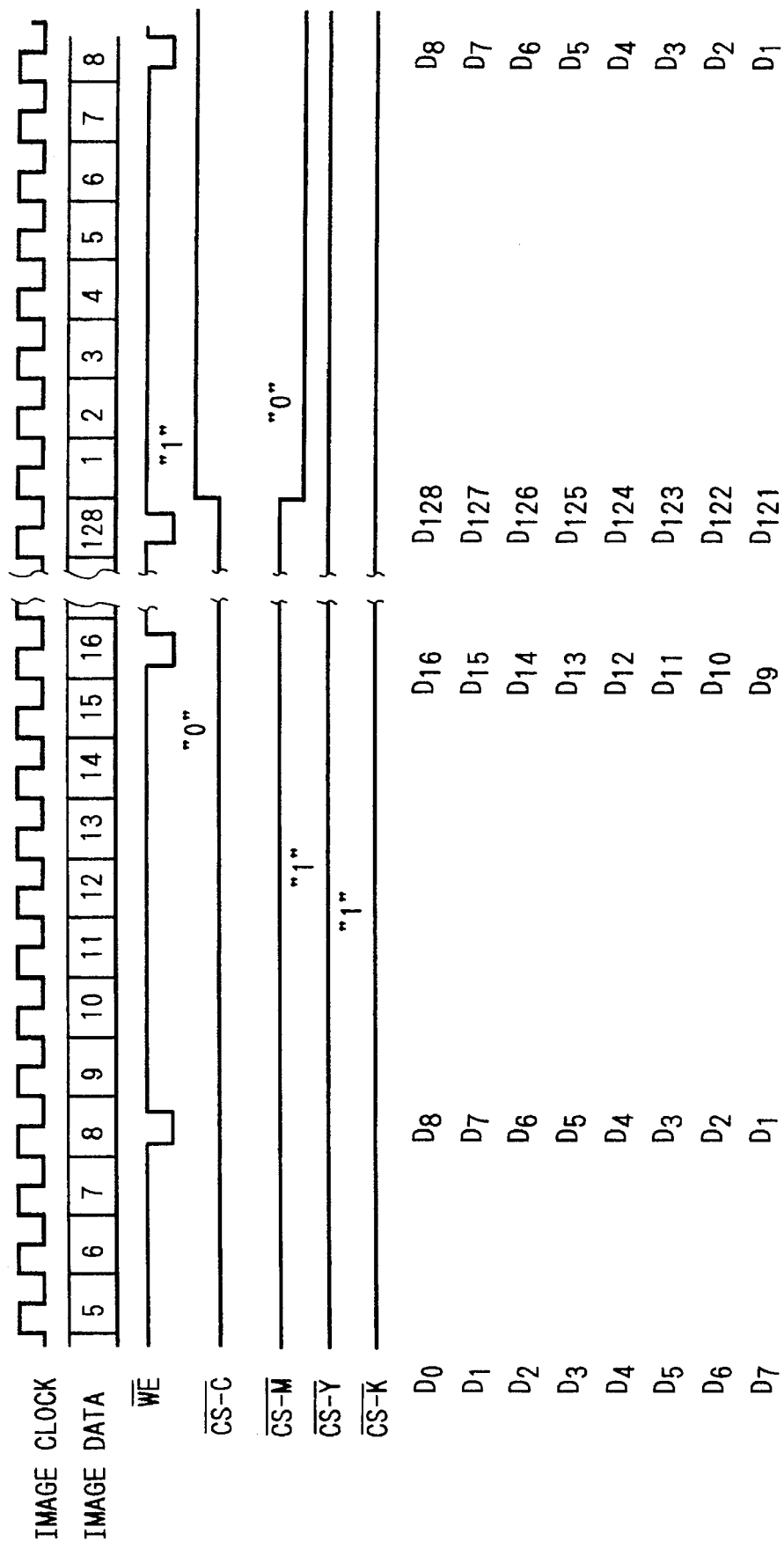
FIG. 21 is a timing chart for illustration of the allotment processing when developing the monochromatic image data into RAM.

When monochromatic recording is performed with the respective printing heads of the carriage 901 being all made the heads of the same color, the change-over signal is made "1". The timing chart at this time is shown in FIG. 21. As shown in the Figure, to the output lines $D_0$–$D_7$ are outputted continuous 8-bit data ($Q_0$, $Q_1$, ... $Q_7$). When 8-bit data are written into the desired RAM for 16 times, it becomes 128-bit, whereby the chip select signal (CS signal) is changed over to be transferred to the next RAM.

Next, the outline of data outputting in monochromatic printing is to be described.

In RAM 203–206, data for each four-line interval shown respectively in FIGS. 18B–18E is stored in a continuous address. However, by making the scanning speed of the carriage 901 4-fold of that during color printing, printing done using the respective heads to may create a problem. That is, for performing printing as shown in FIG. 18A, it is necessary to vary the printing timing with the respective heads by one dot. To describe more specifically, in monochromatic printing, $t_1$–$t_4$ in FIG. 17 must be changeable to the scanning time unit corresponding to one dot.

Figure 22:
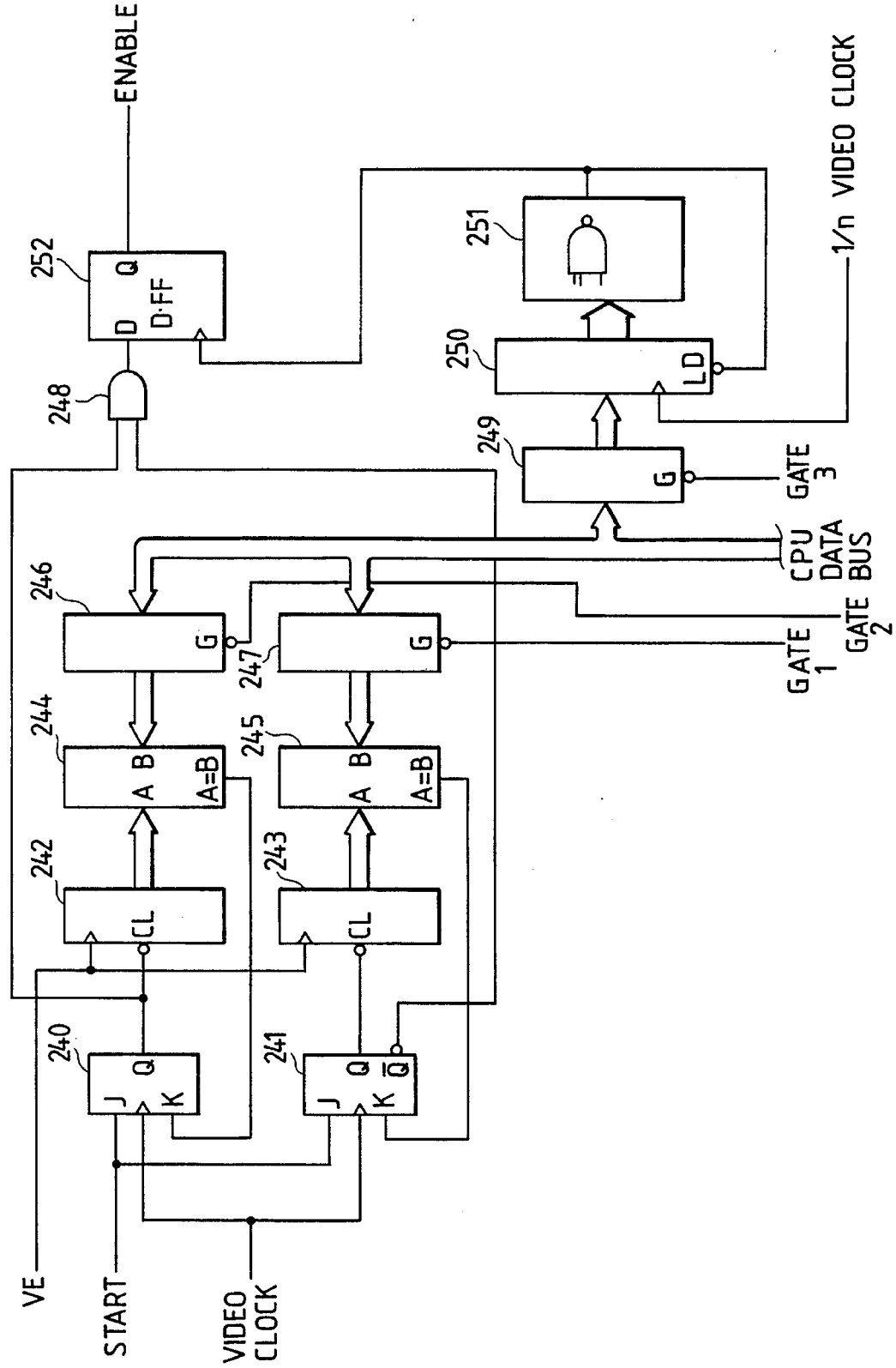
FIG. 22 is an illustration showing an example of the circuit according to the data output (reading) of the memory control circuit of an example.

Accordingly, in this example, the circuit is constructed as shown in FIG. 22. This circuit forms a part of the memory control circuit 2, and each RAM is equipped with the same circuit.

In the Figure shown, 240 and 241 are JK-flip-flops, 242 and 243 are counters, 244 and 245 ... are coincident circuits, 246 and 247 are registers.

The register 246 and the register 247 are connected to the data bus, and CPU 212 can write desired data by enabling gate signals to the respective registers.

Now, CPU 212 houses the data indicating the driving initiation timing of the desired head in the register 246 and the data indicating the completion time in the register 247.

Figure 17:
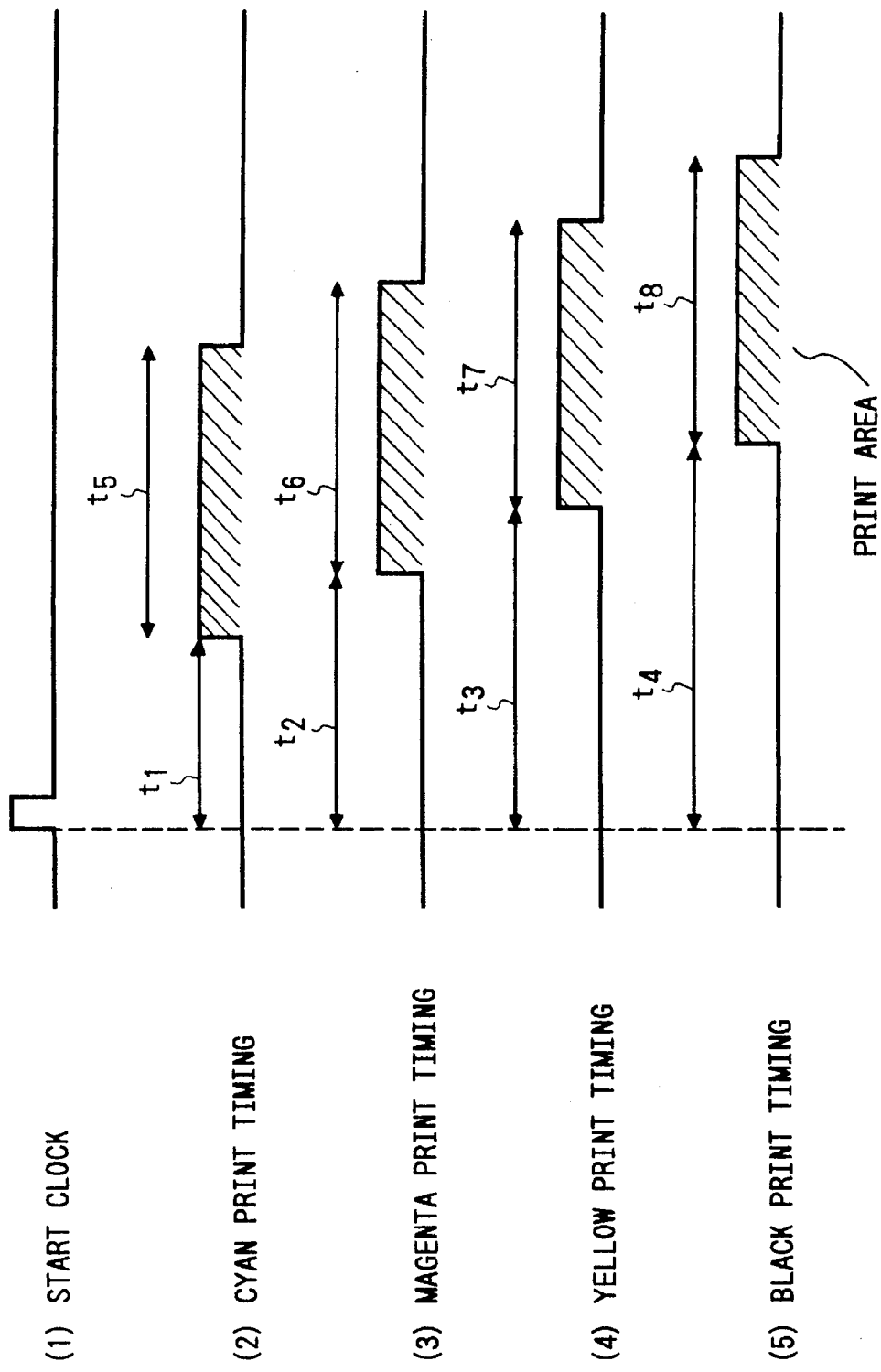
FIG. 17 is a timing chart showing the printing timing of the respective recording heads.

Therefore, with the JK-flip-flop 240, the counter 242, the coincident circuit 244 and the register 246, for example $t_1$ (or $t_1$–$t_4$) in FIG. 17 is counted. When the video clock number counted by the counter 242 and the data housed in the register 246 are coincident, the output Q of the JK-flip-flop becomes "1".

Similarly with the JK-flip-flop 241, the counter 243, the coincident circuit 245 and the register 247, $t_1+t_5$ (or $t_2+t_6-t_4+t_8$) are counted. When the count value of the counter 243 and the value of the register 247 are coincident, the output of the JK-flip-flop becomes "0".

Therefore, it can be understood that the output from the AND gate 248 becomes the slash line region shown in FIG. 17. Practically, the signal from the AND gate 248 may be also made the enable signal when reading the data from the respective RAM, but in this example, correction in finer precision is rendered possible by using the register 249, the counter 250 and NAND circuit 251. N-mal counter is constituted with the register 249, the counter 250 and the NAND circuit 251 as a matter of course. With the N-mal counter as the clock, by striking with the D-flip-flop 252, finer control can be done.

To summarize the above description, it can be understood that it becomes possible to control timing at least during monochromatic printing by changing the writing data in the registers 246, 247. Then, the moving speed of the carriage 901 may be made 4-fold of that during color printing.

In the example as described above, there has been described a color ink jet printer with 4 heads, but in the case of 2-head printer, the printing speed can be made 2-fold with the same principle.

Figure 23:
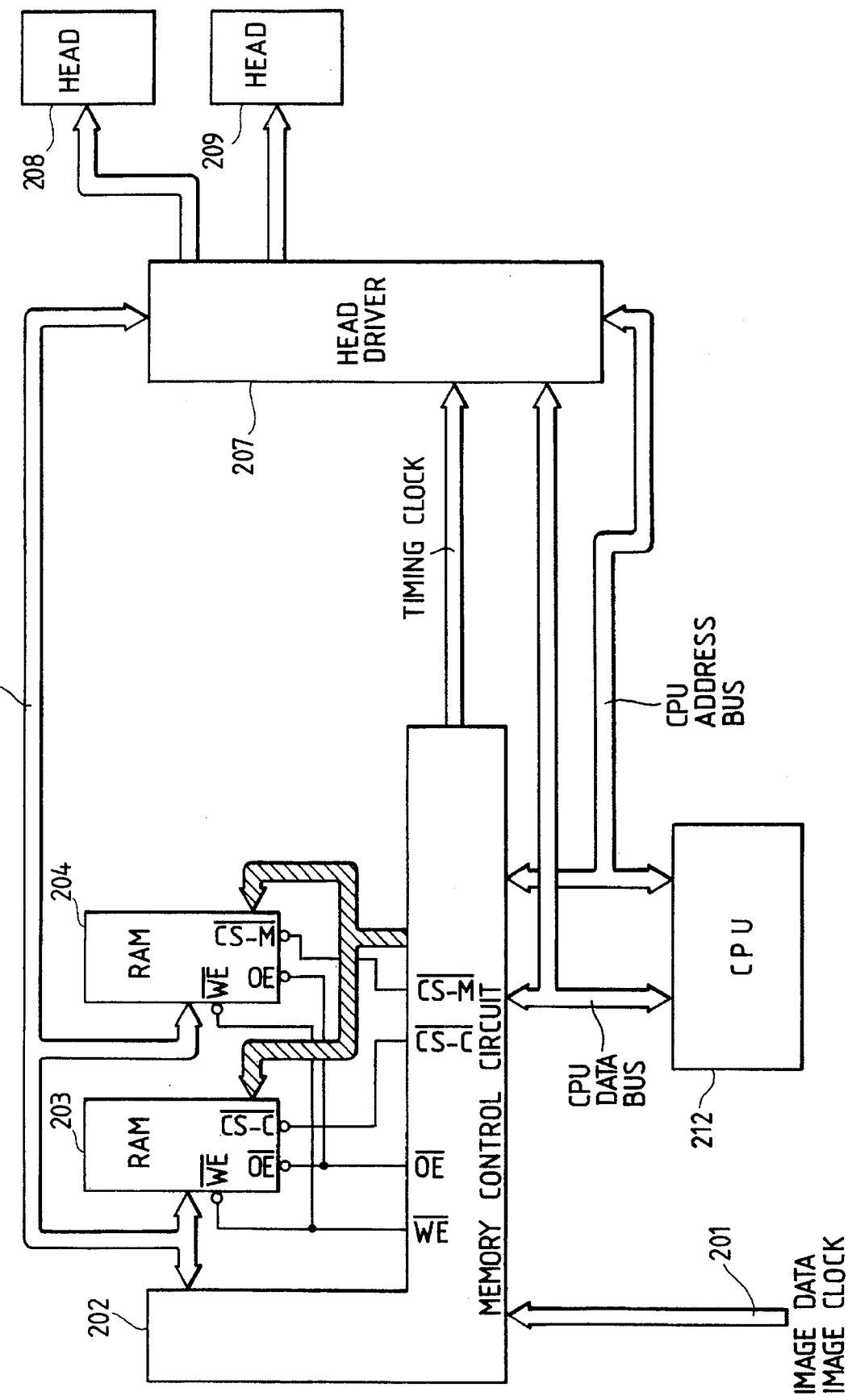
FIG. 23 is a block diagram of the control system of the bubble jet printer in another example.

FIG. 23 shows a block diagram of the control system in this example.

Increase of printing speed leads to greater loading on the motor which moves the carriage corresponding thereto, and therefore driving the motor at too high speed may require enlargement or higher costs for the of instrument. For this reason, in this example, an example which makes the printing speed 2-fold is shown. Since the constitution and the actuation shown in the Figure are redundant with the example as described above, and therefore detailed description thereof is omitted.

Although it is conceivable to form 3 heads, thereby making the speed 3-fold as a matter of course, two or four heads are preferable in constitution of the circuit.

Figure 24:
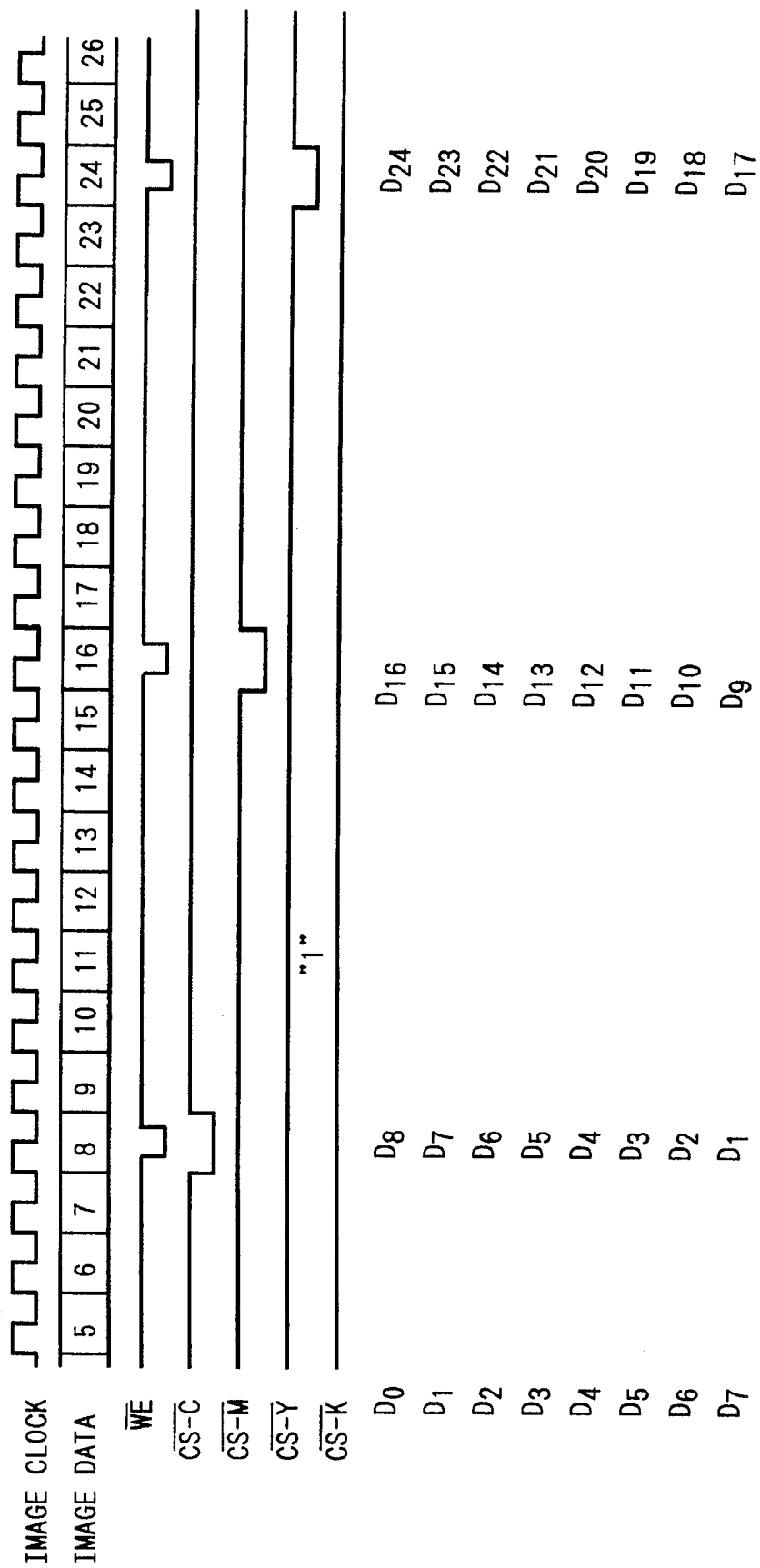
FIG. 24 is a timing chart for illustration of the data allotment processing in another example.

Also, writing into the memory and driving of the head are done by dividing the input data each into 128 bits which is the bit number possessed by the head. Division each into one line (128 bits) has been done merely for for simplicity, and therefore other formats may be also available without any problem. An example of the timing chart is shown in FIG. 24.

In the case shown in the Figure, the chip select signal is changed over every 8 bits, showing the case in which the first 8 bits are stored in RAM 203, the next 8 bits in RAM 204, the next 8 bits in RAM 205, the next 8 bits in RAM 206, and the next 8 bits in RAM 203. Ordinarily, the head is driven dividedly and, for example, even when there may be data of 128 bits, driving is done in 16 divisions each of 8 bits, and therefore the driving frequency is not substantially changed as in the example shown in FIG. 24.

As described above, in this example, as shown in FIG. 18, the interval toward the scanning direction recorded by the four respective recording heads of cyan, yellow, magenta, black is made the distance of 4 dots interval corresponding to the number of the recording heads, and the recording positions with the individual recording heads are made so as not to overlap each other. Therefore, high speed printing can be performed.

As described above, according to this example, since printing is performed with N colors, in a device which performs recording of images by scanning movement of a carriage having N recording heads mounted at predetermined intervals, in the case of performing monochromatic printing, it becomes possible to perform recording at a speed N-fold of that during color printing at the maximum.

When going from multi-color printing to monochromatic printing (or vice versa), it becomes necessary to inform CPU 12 of such change by some means, and various means may be conceivable. For example, an operational panel may be provided on the main device and direction made from the panel, or alternatively a sensor, etc. for discriminating the kind of the cartridge mounted on the carriage may be provided for automatic judgement. Shortly speaking, it is only sufficient to inform the CPU 12 of whether multi-color printing or monochromatic printing is to be performed, and therefore the present invention is not limited by this.

Also, in this example, description has been made using the example of an ink jet printer, particularly bubble jet printer, but since the same principle is applicable if the device is required to have predetermined head driving intervals or more, the present invention is not limited to that type of printer.

As described above, according to the present invention, recording is performed by mutual divided allotments of the respective recording heads, whereby it becomes possible to perform image recording at high speed without increasing the driving intervals of the recording heads.

Figure 25:
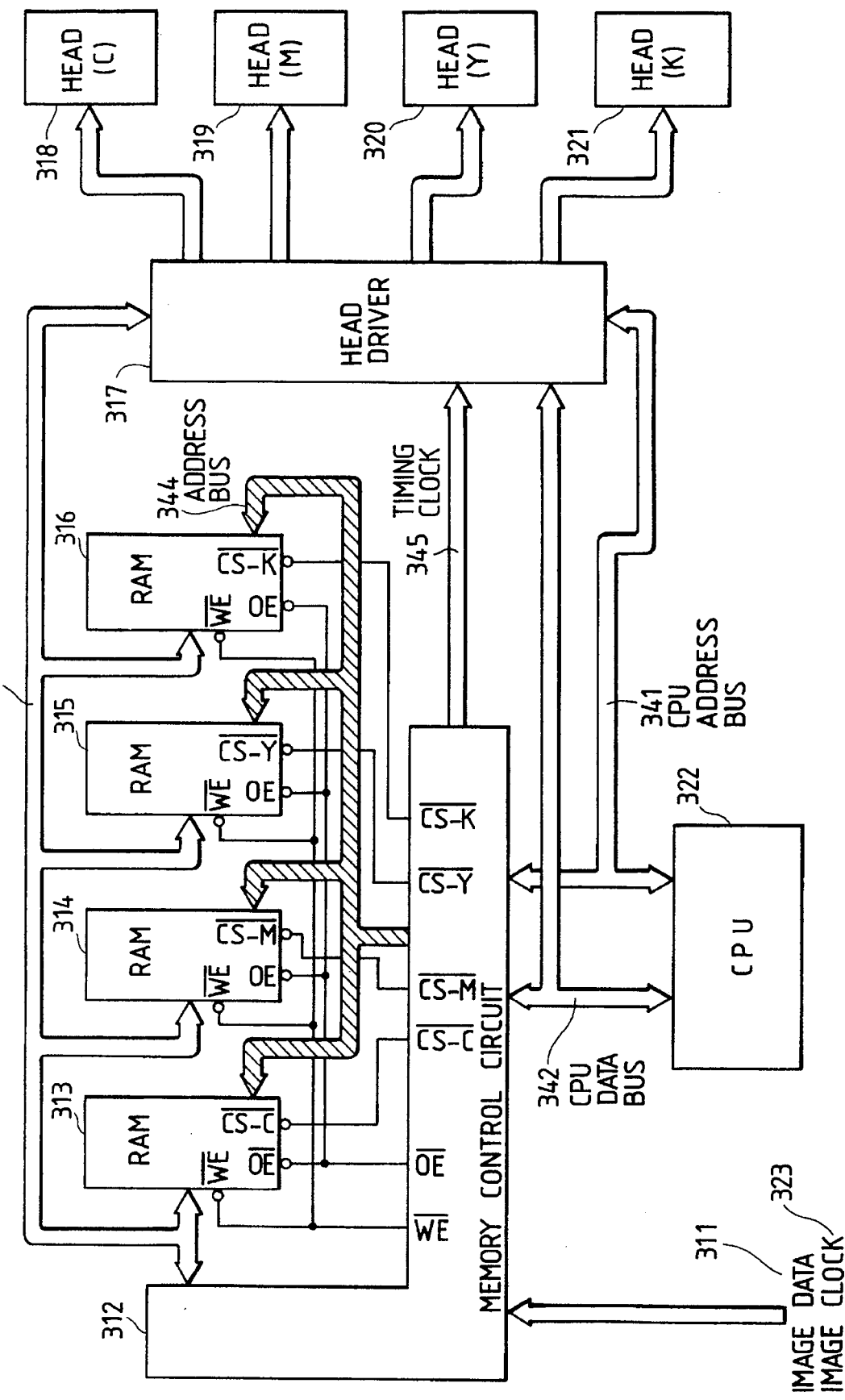
FIG. 25 is the whole block diagram of another example to which the present invention is applied.

Still another example to which the present invention is applied is described below. Also, in the example described below, FIG. 5, FIG. 6 and FIG. 12 as described above are employed. Under the constitution shown in FIG. 5, FIG. 6 and FIG. 12, another specific example to which the present invention has been applied is described on the basis of FIG. 25 through FIG. 30. First, the block diagram concerning the present invention is shown in FIG. 25.

The data 311 sent to the printer are separated for respective colors or respective predetermined signals by a memory control circuit 312 and written in a memory (RAM) 313 or 316.

In the case of color printer, signals of cyan, magenta, yellow and black are inputted serially, and cyan allotted to the memory 313, magenta to the memory 314, yellow to the memory 315 and black to the memory 316.

The data in the memory 313 are sent through the head driver 317 to the cyan head 318, the data in the memory 314 through the head driver 317 to the magenta head 319, the data in the memory 315 through the head driver 317 to the yellow head 320 and the data in the memory 316 through the head driver 317 to the black head 321. The heads 318–321 are mounted on the carriage 901 as described above.

The memories from 313 to 316 are all controlled by the memory control circuit 312. The memory control circuit 312 is controlled by the image signal 311 and the control signals delivered from CPU 322. Ordinarily, the control system is made into one chip of LSI such as gate array, etc. From CPU 322, in addition to 1 CPU data bus 341 and the address bus 342, are connected control lines such as read signals or write signals, etc., although not shown here.

Similarly as CPU 322, control lines are also connected to the head driver 317. Also, the head driver 317 includes a power circuit for driving ink jet head. However, here, it is itself well known and therefore its detailed description is omitted. In FIG. 25, 343 is data bus, 344 address bus and 345 timing clock.

FIG. 26 shows the recording timings of the respective heads. As shown in the Figure, recording is initiated in the order of cyan, magenta, yellow, black. These timings are generated by the circuits assembled in the memory control circuit in FIG. 25, but detailed description is omitted.

By managing the times of $t_1$ to $t_4$ in FIG. 26, the recording timings of the respective heads can be determined to correct the so called regi-slippages.

Next, the blank discharge data generating section which is the center of the present invention is described.

FIG. 27 shows the block diagram of the blank discharge data generating section of the first example of the present invention. The image signal 311 and the image clock 323 are the same as in FIG. 25. Based on the image clock 323, the clock of the shift register 325 is made by the counter circuit 324.

The shift register 325 has the set value of the register 326 preset by the load signal 327. The shift register 325 is constituted in a ring shape so that the data of the register 326 may be turned around.

328 is a selector circuit, which selects one of the image signal 311 or the blank discharge data with the select signal 329 and passes it over to the next step 330. Ordinarily, the next step 330 becomes the image data 311 in FIG. 25.

Figure 28:
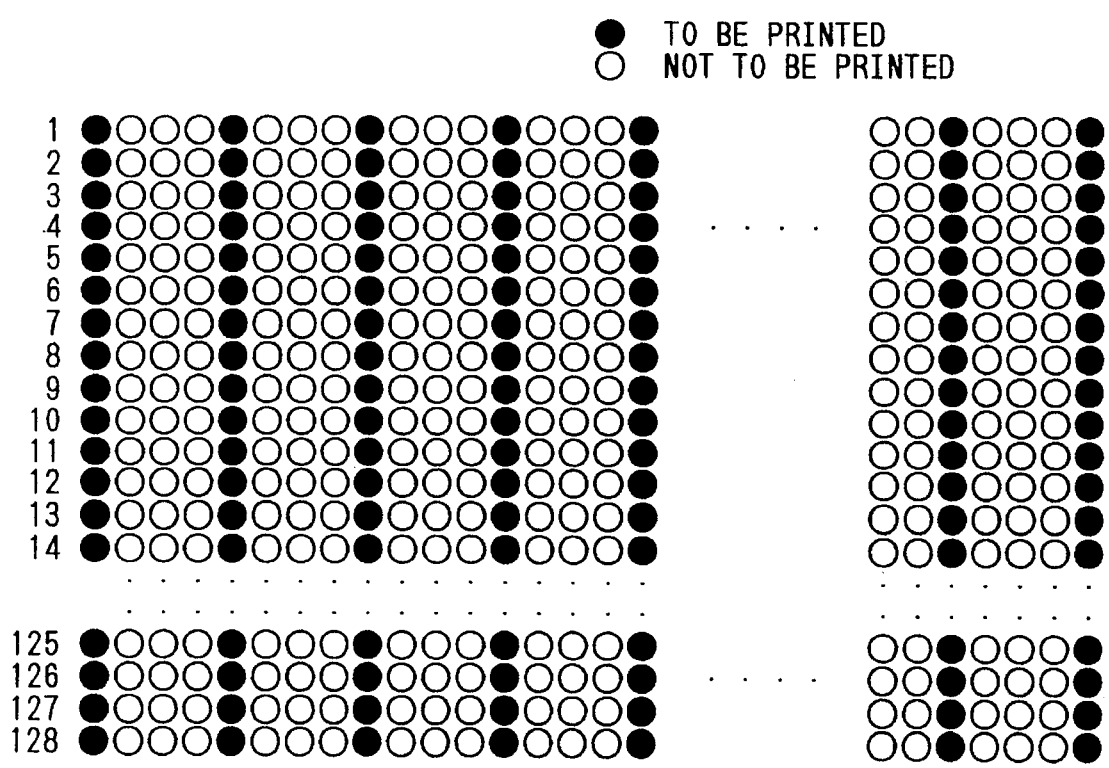
FIG. 28 is an illustration of a black discharge printing example.

To describe in more detail based on practical data, now suppose formation of the black discharge data as shown in FIG. 28. In the example shown in FIG. 28, the head having 128 nozzles are under blank actuation at a rate of once per 4 times.

Now, under such specification, suppose that CPU writes blank discharge data of 1000 shots for every nozzle in RAM. When, as a premise, RAM is constituted of 4 BIT, write time of CPU 5 μsec, heads are 4 heads (4-color constitution) each constituted of 128 nozzles, a time as long as 1000×4(DOT/nozzle)×128(nozzle/head)×4(head)/4(BIT)×10μsec=5.12 sec is consumed.

This time is a great problem when the throughput of the printer is considered. Accordingly, an attempt to realize high speed blank discharge actuation in a hardware circuit is the circuit shown in FIG. 27. When the blank discharge is realized by the circuit constitution shown in FIG. 27, the timing chart becomes as shown in FIG. 29.

Figure 29:
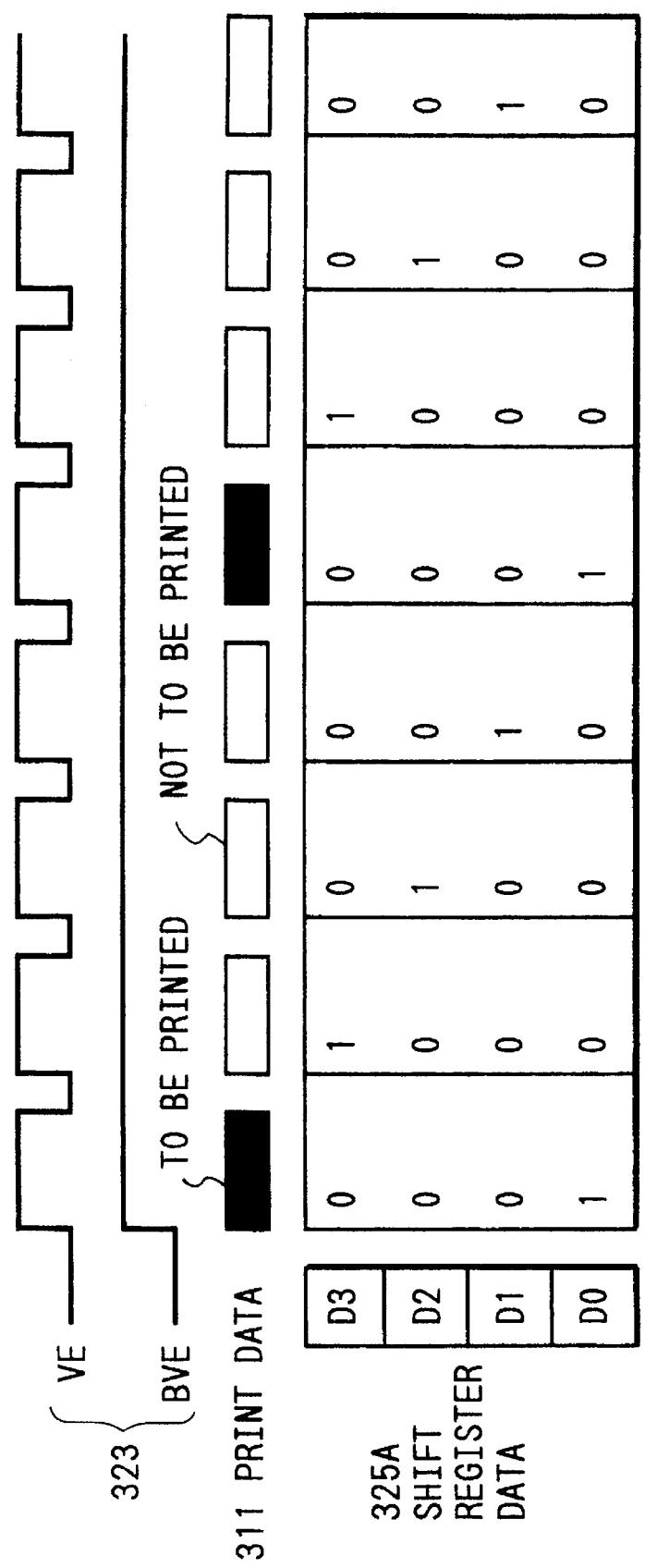
FIG. 29 is a timing chart of blank discharge signal.

In FIG. 29, VE are video enable signals corresponding to 128 nozzles, BVE is block video enable signal showing effective range of image data, 325A is an example of shift register data, and in this case, timing change occurs as shown in FIG. 29 with 4 bit constitution.

In this example, the clock of the shift register data needed not be constituted by a counter circuit but the signal VE as such may be employed.

FIG. 30 shows the second example of the present invention. In FIG. 30, the same sites as in FIG. 27 are affixed with the same symbols. This example, in place of forming a shift register clock with the counter circuit 324 as shown in FIG. 27, utilizes the signal of the writing address formation counter of RAM. The writing address formation counter of RAM is included in the memory control circuit 312 shown in FIG. 25, but is not described here in detail.

Figure 31:
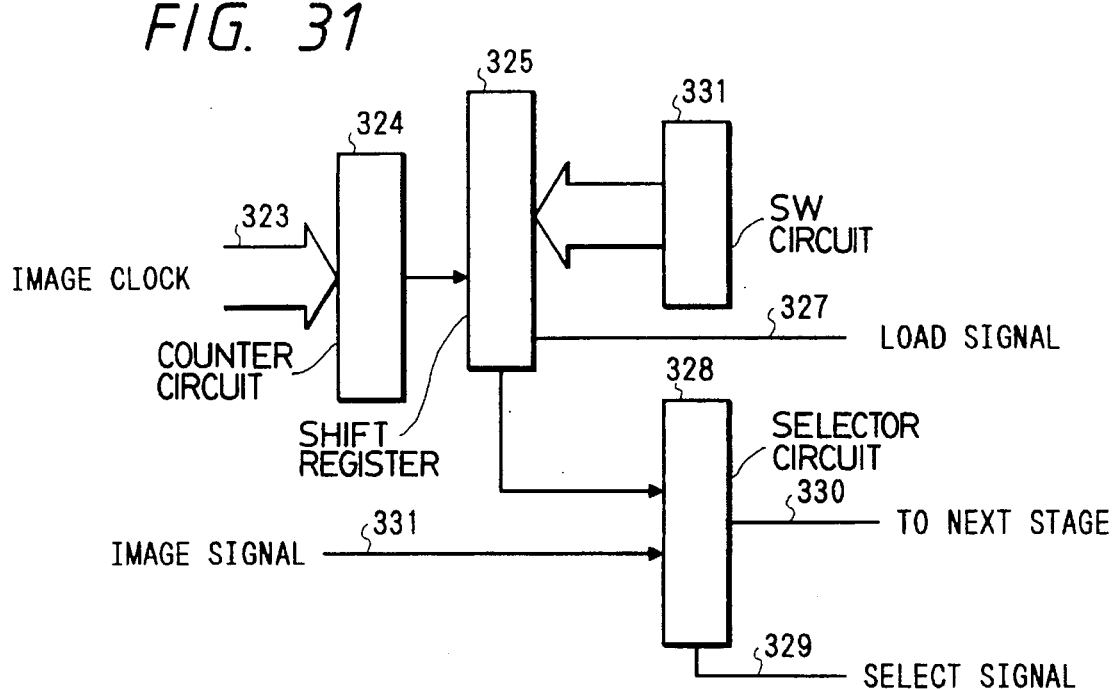
FIG. 31 is an illustration showing another example of the present invention.

FIG. 31 shows the third example of the present invention. In this example, blank discharge data pattern is determined in an externally fixed SW circuit 331.

Figure 32:
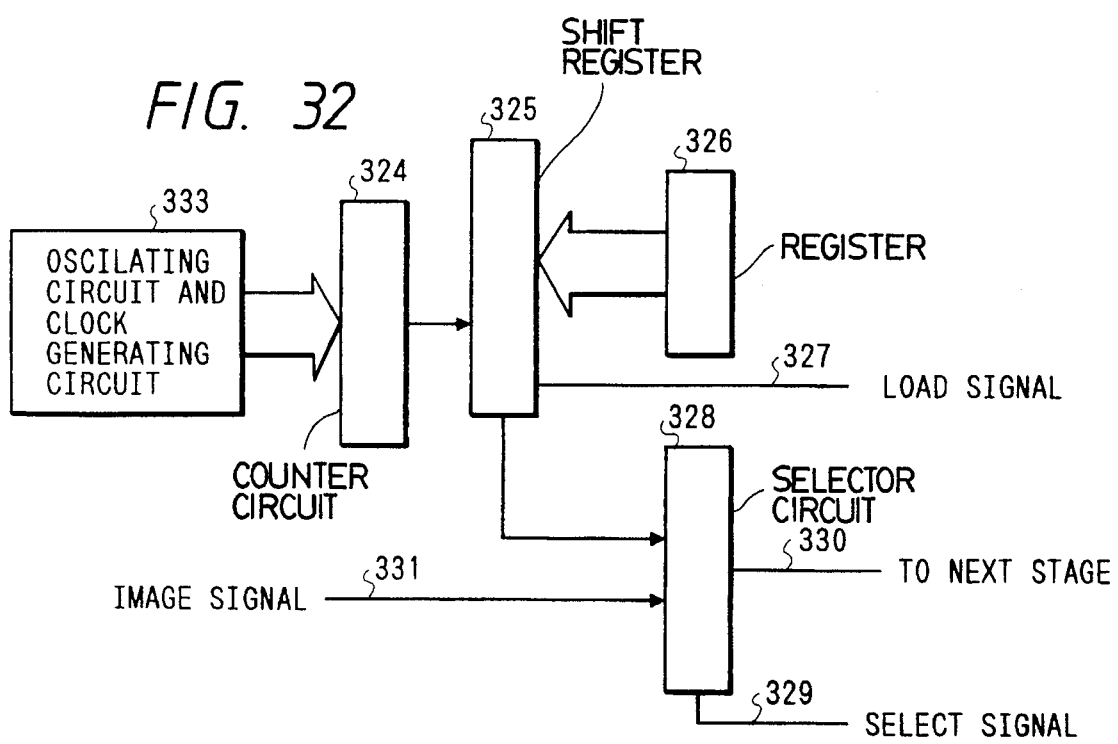
FIG. 32 is an illustration showing another example of the present invention.

FIG. 32 shows the fourth example of the present invention. In this example, an oscillation circuit for driving the blank discharge data formation circuit and a clock formation circuit 333 are independently provided. In this case, while there is the disadvantage that costs are increased by provision of the circuit 333 and by use of a clock with higher speed than image clock, there is the benefit that writing of blank discharge data into RAM can be done at higher speed.

As described above, in this example, the constitution is made such that:

(1) the connecting memory (buffer RAM) for head interval correction is utilized as the accumulation means of blank discharge data;

(2) the circuit for connecting memory is to be used commonly with the image signal processing circuit;

(3) writing of blank discharge data into connecting memory is constituted of a hardware rather than CPU;

(4) the pattern of blank discharge data is made from a selectable form, using a CPU set or an externally fixed system;

(5) the driving of blank discharge data formation section it to be utilized commonly with image clock, whereby a blank discharge data formation of high speed and low cost can be realized.

The respective examples as described above will bring about excellent effects in recording devices to which the ink jet recording system, above all the bubble jet recording system has been applied.

As for its representative constitution and principle, for example, it is most preferable to perform the system by use of the basic principle disclosed in U.S. Pat. Nos. 4,723,129 and 4,740,796. This system is applicable to either the so called on-demand type or the continuous type, but particularly in the case of the on-demand type, it is effective because by applying at least one driving signal which gives abrupt temperature elevation exceeding nucleus boiling corresponding to recording information to the electrothermal transducer arranged corresponding to the sheet or liquid pathway in which liquid (ink) is held, heat energy can be generated in the electrothermal transducer to effect film boiling on the heat acting surface of the recording head, consequently forming bubbles in the liquid (ink) corresponding one by one to the driving signal. By growth and shrinkage of the bubbles, the liquid (ink) is discharged through opening for discharge to form at least one droplet. When the driving signal is made in pulse form, growth and shrinkage of bubbles can be effected instantly and adequately, whereby discharge of the liquid (ink) particularly excellent in response can be accomplished more preferably. As the driving signal for such pulse shape, those as described in U.S. Pat. Nos. 4,463,359, 4,345,262 are suitable. By employment of the conditions described in U.S. Pat. No. 4,313,124 of the invention concerning the temperature elevation rate of the above-mentioned heat-acting surface, further excellent recording can be performed.

As the constitution of the recording head, in addition to the combined constitution of discharge opening, liquid pathway, electrothermal transducer (linear liquid pathway or right angle liquid pathway), the constitution by use of U.S. Pat. Nos. 4,558,333, 4,459,600 disclosing the constitution having the heat-acting section arranged in flexed portion is also applicable to the above-described examples. In addition, the above-described examples are also effective when the constitution may be made on the basis of Japanese Patent Laid-open Application No. 59-123670 disclosing the constitution in which the common slit is made the discharge section of electrothermal transducer or Japanese Patent Laid-open Application No. 59-138461 disclosing the constitution in which the opening for absorbing the pressure liquid of heat energy is made correspondent to the discharge section.

Additionally, the above-described respective examples are also effective when a recording head of the chip type freely exchangeable which enables electrical connection with the main device and feeding of ink from the main device by being mounted on the main device, or a recording head of the cartridge type which is provided integrally on the recording head itself is used.

Also, addition of restoration means for the recording head, preliminary auxiliary means, etc. as the constitution of the recording device of the above-described examples is also preferable because the effects of the above-described examples can be further stabilized. To mention these specifically, capping means, cleaning means, pressurization or aspiration means for recording heads, electrothermal transducer or heating elements separate from this or preliminary heating means in combination of these, and preliminary discharge mode which practices discharge separate from recording are also effective for performing stable recording.

Further, as the recording mode of the recording device, not only for the recording only of the main color such as black color, etc., but also for a device equipped with at least one full-color by plural colors of different colors or color mixing, the above-described examples are extremely effective.

In the examples of the ink jet recording devices as described above, descriptions have been made about ink as liquid, but, for example, an ink which is solidified at room temperature or lower and is softened or becomes liquid at room temperature or higher may be also employed. In the above-described ink jet, it is generally practiced to control temperature within the range of 30° C. to 70° C. so that the viscosity of the ink may be within stable discharge range, and therefore any ink which becomes liquid during imparting recording signals may be available. In addition, use of an ink with the property liquefied for the first time by heat energy is also applicable to the present examples, such as an ink which is prevented from temperature elevation by heat energy by using it as the energy for phase change from solid state to liquid state of ink, or solidified under the state left to stand for the purpose of preventing evaporation of ink, anyway an ink which is liquefied by imparting heat energy corresponding to recording signals or begins to be solidified when reaching the recording medium. In such case, the ink may be made in the form as opposed to the electrothermal transducer under the state held as liquid or solid substance in a porous sheet concavity or thru-hole as described in Japanese Patent Laid-open Patent Applications Nos. 54-56847 or 60-71260. In the above-described examples, the most effective one for the respective inks as described above is one which performs the film boiling system as described above. However, as the energy generating means which generates ink discharge energy, the electrothermal transducer as mentioned above is not limitative of the present invention, but an electromechanical transducer such as piezoelectric element, etc. or a system of irradiating electromagnetic waves such as laser, etc. to be absorbed in a liquid to generate heat and discharging ink by the heat-generating action may be also employed.

As described above, according to the present invention, a recording device and a recording method which can perform recording of high quality can be provided.

I claim:

1. A recording device which performs recording on a recording medium, comprising:

a recording head having a plurality of recording elements arranged in an array having a slant within a given one row relative to a direction vertical to a relative moving direction with respect to said recording medium so as to compensate for a difference in a driving time due to a time divided driving;

driving means for driving said recording elements;

moving means for moving said recording head reciprocally for both a going way recording and a returning way recording during a driving interval and over a distance such that said recording head serves to perform both a going way recording and a returning way recording;

memorizing means for memorizing an image data;

reading and supplying means for reading and supplying the image data memorized by said memorizing means; and control means for controlling recording by said recording head by dividing the plurality of recording elements constituting said array of recording elements into a plurality of blocks, which said blocks are defined by said control means such that each said block is formed by a plurality of continuous said recording elements disposed along a length of arrangement, and said control means controlling said recording head in the going way recording by causing said driving means to drive in a going way order by time division each of said blocks, memorizing the image data memorized by said memorizing means, and said control means controlling said recording head in the returning way recording by effecting reading and supplying by said reading and supplying means of said image data memorized by said memorizing means in said respective blocks to cause said driving means to drive said recording elements in an order opposite to the order in the going way recording, wherein said slant of said array depends on the distance over which said recording head moves relatively during the driving interval in which said blocks are driven in a time divided manner and the length of arrangement of said plurality of said continuous recording elements of each said block, and a degree of slant of one said block is within the size of a single said recording element as measured in a relative moving direction of said recording head with respect to the recording medium.

2. A recording method for recording on a recording medium, comprising the steps of:

memorizing image data to be recorded by a recording head having a plurality of recording elements providing said recording head having plurality of recording elements arranged in a linear array having a slant within one row relative to a direction vertical to a relative moving direction with respect to said recording medium, the line being slanted so as to compensate for a difference in a driving time due to a time divided driving;

dividing the plurality of recording elements constituting said linear array into a plurality of blocks, which said blocks are selected such that each said block is formed by a plurality of continuous said recording elements disposed along a length of arrangement;

carrying out a going way recording by driving said recording elements in a going way order using time division for each of said blocks; and carrying out a returning way recording by reading and supplying a plurality of said image data memorized in said memorizing step in said respective blocks to be driven in an order opposite to the going way order, wherein said slant of said array depends on a distance over which said recording head moves relatively and the length of arrangement of said plurality of continuous recording elements of each said block during a driving interval in which said blocks are driven in a time divided manner, and a degree of slant of one said block is within the size of a single said recording element as measured in a relative moving direction of said recording head with respect to the recording medium.

3. A recording device having a recording head having a plurality of recording elements arranged in a linear array for performing dot recording corresponding to a plurality of image data arrayed in a row, said recording head being divided into a plurality of blocks, each said block being formed by a plurality of continuous said recording elements disposed along a length of arrangement, which said recording device drives each said block of said plurality of recording elements by time divided driving and has said linear array of said plurality of recording elements disposed along a slant within one row relative to a direction vertical to a relative moving direction with respect to said recording head in order to compensate for a difference in a driving time due to the time divided driving and correcting a recording slippage of dots which occurs by said time divided driving, said device comprising:

driving means for driving said recording elements;

moving means for moving said recording head reciprocally for both a going way recording and a returning way recording during a driving interval and over a distance such that said recording head serves to perform both a going way recording and a returning way recording;

memory means for temporarily memorizing the image data by associating the image data with a recording position;

designation means for designating successively said blocks to be driven during the returning way recording in an order opposite to an order of the going way recording; and image data reading means for reading the image data associated with a particular said block designated by said designation means and supplying the associated image data to said designated block, wherein said slant of said array depends on the distance over which said recording head moves relatively and the length of arrangement of said plurality of continuous recording elements of each said block during a driving interval in which said blocks are driven in a time divided manner, and a degree of slant of one said block is within the size of a single said recording element as measured in a relative moving direction of said recording head with respect to the recording medium.

4. A recording device according to claim 3, wherein said image data reading means has:

an address counter which generates address signals in a certain order and a logic circuit, which sets the output of said address counter as the reading address corresponding to the memory means during going way recording and sets the reversed signal of the output of said address counter as the reading address corresponding to the memory means during returning way recording.

5. A recording device according to claim 3, wherein said designation means has an up-down counter capable of counting in ascending order and descending order, and the counting order of said up-down counter is changed over depending on whether the recording is going way recording or returning way recording.

6. A recording device according to claim 3, wherein said designation means and said reading means share a counter, said designation means designates said block by use of the counting result of said counter, and said reading means sets the reading address of said memory means by use of the counting result of said counter.

7. A recording method involving providing a recording head having a plurality of recording elements arranged in a linear array for performing dot recording corresponding to an image data arrayed in a row, said recording head being divided into a plurality of blocks, which said blocks are selected such that each said block is formed by a plurality of continuous said recording elements disposed along a length of arrangement, driving each said block by time divided driving, the linear array of the plurality of recording elements having a slant within one row with respect to a direction vertical to a relative moving direction of the recording head in order to compensate for a difference in a driving time due to the time divided driving and correcting a recording slippage of dots which occurs as a result of the time divided driving, comprising the steps of:

momentarily memorizing the image data, in a memory means for memorizing, associated with a recording position;

successively designating given said blocks to be driven during a returning way recording in an order opposite to an order of a going way recording; and reading the image data associated with a particular said designated block from said memory means and supplying the associated image data to said designated block, wherein said slant of said array depends on a distance over which said recording head moves relatively and the length of arrangement of said plurality of continuous recording elements of each said block during a driving interval in which said blocks are driven in a time divided manner, and a degree of slant of one said block is within the size of one said recording element as measured in a relative moving direction of said recording head with respect to the recording medium.

8. An image processing device comprising:.

input means for inputting a plurality of image data of color components successively and repeatedly as synchronized with a predetermined clock;

memory means for memorizing said image data following a given address; and address generating means for generating addresses in synchronization with said predetermined clock;

said address generating means generating a bit of said color components as an upper bit of said address.

9. An image recording device which records an image having a plurality of colors with a carriage having a plurality of recording heads for recording the respective colors placed at predetermined intervals in a main scanning direction mounted thereon said carriage by reading a plurality of image data of the respective colors from a memory having a plurality of recorded image data memorized therein, comprising:

said memory;

input means for inputting the image data of the respective color components successively and in synchronization with a predetermined clock;

address generation means for generating addresses, each said address having a bit number corresponding to an address space of said memory;

address converting means for supplying addresses from the addresses at a lower position generated in said address generation means with at least the bit number corresponding to the recorded color number being exchanged with a remaining group of upper address bits; and writing means for writing the image data inputted by said input means at the address position of said memory supplied by said address converting means.

10. An image recording device according to claim 9, wherein the image data inputted by said input means are serial data, the device is equipped with a converting means for converting said serial data to parallel data of bite units of the respective colors, and said address generation means and said writing means are urged as synchronized when the bite data of the respective colors are formed.

11. A recording apparatus according to claim 9, wherein said reference signal is a predetermined clock pulse.

12. A recording apparatus according to claim 9, wherein said address generating means includes a counter.

13. An image recording device comprising:

a number of recording heads disposed with a plurality of predetermined intervals therebetween in a scanning direction;

a driving means for driving which drives respective said recording heads based on a dot information of a color image, each said recording head having a different color;

wherein the intervals in said scanning direction for recording of the respective heads are made the same as a distance of a dot numbers corresponding to the number of said recording heads, and at least a recording dot position of each of the individual recording heads are not overlapped with each other, each said recording head having a same color, wherein when color image recording is to be performed, different recording colors are allotted for respective said recording heads, and mono-color recording is performed so that dots of the recording head are not overlapped when the color of the recording heads is the same.

14. An image recording device comprising:

a plurality of recording heads arranged at predetermined intervals;

a correcting means for correcting said recording head intervals, said correcting means comprising a memory for accumulating temporarily a plurality of image input data; and a device reading the data accumulating within said memory with a time difference corresponding to said predetermined intervals, wherein the image input data supplied to said recording head corresponds to a memory region momentarily accumulated, and allotment into the memory wherein said image input data are temporarily accumulated is changed over depending on a mounting state of the recording head, said mounting state having a first state such that the recording head has a same color and a second state such that the recording head has a different color, and wherein the arrangement of the image input to the memory varies in accordance with the monocolor recording and the color recording.

15. An image recording device according to claim 13 or claim 14, wherein during monochromatic printing, the printing speed is changed over depending on the number of the writing heads of the same color.

16. An image recording device according to claim 13 or claim 14, wherein the device has the function of distinguishing the colors of said recording heads, and the printing speed is changed over by counting the number of the recording heads of the same color.

17. An ink jet printer comprising:

a plurality of recording heads disposed with a plurality of predetermined intervals therebetween;

memory means for temporarily accumulating a plurality of an inputted image data within said memory means, and for correcting a positional deviation of a plurality of recording heads, said memory means being used for writing an idle discharge pattern;

reading means for reading said image data accumulated in said memory means with a time difference corresponding to the predetermined intervals between said recording heads;

a blank discharge data formation circuit for maintaining an ink discharge performance of said recording head; and writing means for writing a blank discharge signal outputted from said blank discharge data formation circuit into said memory means.

18. An ink jet printer according to claim 17, wherein driving of said blank discharge data formation circuit is performed with an image clock.

19. An ink jet printer according to claim 17, wherein said blank discharge data formation circuit is equipped with a means for setting the output pattern from said formation circuit.

20. A device according to any one of claims 1, 3, 7, 9, 13, 14 and 17, wherein said recording head gives rise to film boiling in ink by the heat energy generated by an electrothermal transducer and discharges ink droplets through the discharge opening as accompanied with growth of bubbles by said film boiling.

21. A recording apparatus for recording on a recording medium by reciprocally scanning a recording head relative to said recording medium over a distance in a scanning direction and in a reciprocal direction which is a reverse of said scanning direction, said apparatus comprising:

a plurality of recording elements arranged on said recording head in an array, an arranged direction of said recording elements having a predetermined slant within one row relative to a direction perpendicular to said scanning direction and said reciprocal direction;

selecting means for sequentially selecting at a predetermined time period a plurality of blocks of a plurality of continuous said recording elements to be preliminarily scanned in accordance with the scanning direction while said recording head is scanned in said reciprocal direction, each said block having a plurality of continuous said recording elements capable of being simultaneously driven and which are disposed along a length of arrangement; and driving means for sequentially supplying recording data corresponding to a given said block selected by said selecting means to said selected block as a driving signal, wherein said predetermined slant depends on the distance over which said recording head is scanned during said predetermined time intervals at which each said block is sequentially selected and the length of arrangement of said plurality of continuous recording elements of each said block, and a degree of slant of one said block is within the size of a single said recording element as measured in a relative moving direction of said recording head with respect to the recording medium.

22. A recording apparatus according to claim 21, further comprising storing means for storing said recording data, said storing means storing said recording data in response to an address corresponding to a recording position.

23. A recording apparatus according to claim 22, wherein said driving means further comprises address counter means for generating a read address to be supplied to said storing means, said address counter means generating said read address in a reverse order in response to a scanning direction during scanning of said recording head in both directions.

24. A recording apparatus according to claim 21, wherein said selecting means further comprises:

an up-down counter for counting up or down in response to a scanning direction during scanning of said recording head in both reciprocal directions; and a decoder for decoding a counted value of said up-down counter to generate a selecting signal.

25. A recording apparatus according to claim 21, wherein said recording head is an ink jet recording head for discharging ink.

26. A recording apparatus according to claim 21, wherein each said recording element of said recording head has a discharge port through which an ink is discharged and a thermal energy generating element corresponding to said discharge port, said thermal energy generating element applying thermal energy to cause a state change of the ink and discharge ink from said discharge port to form a flying ink droplet.

27. A recording apparatus according to claim 21, further comprising a carriage for mounting said recording head to scan said recording head in said reciprocal direction.

28. A recording apparatus according to claim 27, wherein said recording head is mounted on said carriage so that the arranged direction of said recording elements is not perpendicular to said reciprocal direction.

29. An image processing apparatus comprising:

inputting means for sequentially inputting a plurality of image data of a plurality of color components in synchronism with a reference signal, said image data repeating by a predetermined unit said plurality of color components;

a memory for storing said plurality of color components, said memory having an address terminal and a storing location being determined by an address inputted in said address terminal; and address generating means for generating the address to be inputted in said address terminal, said address being in synchronism with said reference signal and an upper part of the address showing each said color component, wherein said address generating means generates a bit for said color components as an upper bit of said address.

30. An apparatus according to claim 29, wherein said reference signal is a predetermined clock pulse.

31. An apparatus according to claim 29, wherein said address generating means includes a counter.

32. An apparatus according to claim 29, wherein said predetermined unit is a recording element unit.

33. An apparatus according to claim 29, wherein said predetermined unit is a one-bit unit.

34. A recording method which performs recording on a recording medium by reciprocally scanning a plurality of recording elements in a main scanning direction relative to the recording medium, comprising the steps of:

arraying said recording elements in a line, dividing said plurality of recording elements, each having a size, into a plurality of blocks, each said block having a plurality of continuous said recording elements, the line being slanted such that a different in position between a first said recording element in a given said block and a last said recording element in the given said block when measured in the main scanning direction is within the size of one said recording element;

memorizing an image data in memory means;

driving in an order in a time divided manner each of said blocks during a going way recording in the main scanning direction; and when carrying out a returning way recording, reading and supplying a plurality of said image data memorized in said memory means corresponding to respective said blocks to be driven in an order opposite to the order in the going way recording.

35. A recording apparatus for recording on a recording medium by reciprocally scanning a plurality of recording elements in a main scanning direction relative to the recording medium, comprising:

an array of said recording elements arranged in a line, said plurality of recording elements comprising a plurality of blocks which are to be simultaneously driven, each said block having a size and a plurality of continuous said recording elements, the line being slanted such that a difference in position between a first said recording element in a given said block and a last said recording element in the given said block when measured in the main scanning direction is within the size of one said recording element;

storing means for storing an image data;

selecting means for sequentially selecting said blocks;

driving means for driving in an order in a time-divided manner each of said blocks during a going way recording in the main scanning direction; and means for reading and supplying a plurality of said image data stored in said storing means corresponding to respective said blocks to be driven in an order opposite to the order in the going way recording when carrying out a returning way recording.

36. A recording apparatus according to claim 35, wherein said storing means stores said image data in accordance with an address corresponding to a recording position.

37. A recording apparatus according to claim 36, wherein said driving means further comprises address counting means for generating an address to be supplied to said storing means, said address counter means generating said address in a reverse order in response to a scanning direction during scanning of said recording head in both directions.

38. A recording apparatus according to claim 37, wherein said recording elements are part of an ink jet recording head for discharging ink.

39. A recording apparatus according to claim 36, wherein said selecting means further comprises:

an up-down counter for counting up or down in response to the scanning direction during reciprocal scanning of said recording head in both scanning directions; and a decoder for decoding a counted value of said up-down counter to generate a designation signal.

40. A recording apparatus according to claim 36, wherein said recording elements are part of an ink jet recording head for discharging an ink.

41. A recording apparatus according to claim 35, wherein said driving means further comprises address counting means for generating an address to be supplied to said storing means, said address counter means generating said address in a reverse order in response to a scanning direction during scanning of said recording head in both directions.

42. A recording apparatus according to claim 41 or 37, wherein said selecting means further comprises:

an up-down counter for counting up or down in response to the scanning direction during reciprocal scanning of said recording head in both scanning directions; and a decoder for decoding a counted value of said up-down counter to generate a designation signal.

43. A recording apparatus according to claim 42, wherein said recording elements are part of an ink jet recording head for discharging an ink.

44. A recording apparatus according to claim 41, wherein said recording elements are part of an ink jet recording head for discharging an ink.

45. A recording apparatus according to claim 35, wherein said selecting means further comprises:

an up-down counter for counting up or down in response to the scanning direction during reciprocal scanning of said recording head in both scanning directions; and a decoder for decoding a counted value of said up-down counter to generate a designation signal.

46. A recording apparatus according to claim 35, wherein said recording elements are part of an ink jet recording head for discharging an ink.

47. A recording method which performs recording on a recording medium by scanning a plurality of recording elements in a main scanning direction relative to the recording medium, comprising the steps of:

arraying a plurality of recording elements so as to be arranged in a line, dividing said plurality of recording elements into a plurality of blocks, each said block having a plurality of continuous said recording elements, the line being slanted such that the difference between the first element in a given said block and a last element in said given block when measured in the main scan direction is equal to a distance which each recording element moves relative to the recording medium in the main scan direction from driving of the first element of a block to record to driving of the first element of an adjacent block to be next driven to record;

memorizing the image data in a memory means for memorizing;

driving in an order by time division each of said blocks during a going way recording in the main scanning direction; and when carrying out returning way recording, reading and supplying a plurality of image data memorized in said memorizing means corresponding to said respective blocks to be driven in an order opposite to the order in the going way recording.

48. A recording apparatus for recording on a recording medium by scanning a plurality of recording elements in a main scanning direction relative to the recording medium, comprising:

an array of said plurality of recording elements disposed so as to be arranged in a line, a plurality of blocks consisting of said plurality of recording elements, each block having a plurality of continuous said recording elements being simultaneously driven, the line being slanted such that the difference between the first element in a block and the last element in said block when measured in the main scan direction is equal to a distance which each recording element moves relative to the recording medium in the main scan direction from driving of the first element of a block to record to driving of the first element of an adjacent block to be next driven to record;

storing means for storing image data;

selecting means for sequentially selecting said blocks; and driving means for driving in an order by time division each of said blocks during a going way recording in the main scanning direction, and when carrying out a returning way recording, reading and supplying a plurality of said image data stored in said storing means corresponding to said respective blocks to be driven in an order opposite to the order in the going way recording.

* * * * *

UNITED STATES PATENT AND TRADEMARK OFFICE
CERTIFICATE OF CORRECTION

PATENT NO. : 5,621,440

DATED : April 15, 1997

INVENTOR(S): KAZUYOSHI TAKAHASHI

It is certified that error appears in the above-identified patent and that said Letters Patent is hereby corrected as shown below:

On title page, item

[56] REFERENCES CITED

FOREIGN PATENT DOCUMENTS
      "13075759" should read --1-030757--.

COLUMN 1

Line 26, "so called" should read --so-called--.
    Line 28, "so called" should read --so-called--.

COLUMN 2

Line 16, "task" should read --problem--.
    Line 22, "much" should read --such--.
    Line 53, "task" should read --problem--.

COLUMN 3

Line 8, "tasks" should read --problem--.
    Line 13, "ink" should be deleted.

COLUMN 5

Line 7, "invention;" should read --invention; and--.

COLUMN 6

Line 34, "with" should be deleted.
    Line 53, "nucleus" should read --nucleate--.

UNITED STATES PATENT AND TRADEMARK OFFICE
CERTIFICATE OF CORRECTION

PATENT NO. : 5,621,440

DATED : April 15, 1997

INVENTOR(S): KAZUYOSHI TAKAHASHI

It is certified that error appears in the above-identified patent and that said Letters Patent is hereby corrected as shown below:

COLUMN 7

```
Line 9, "imaged" should read --image--.
Line 23, "4 bit" (first occurrence) should read
    --4 bits--.
Line 32, "select" should read --selects--.
Line 61, "of (decimal" should read
    --of "0", "1" (decimal--.
Line 63, "takes" should read --take--.
```

COLUMN 8

```
Line 42, "as" should be deleted.
Line 61, "counters 10," should read --counters 10, 5--.
```

COLUMN 9

```
Line 15, "recording" should be deleted; and
    "way" should read --way recording--.
Line 24, "above" (second occurrence) should be deleted.
Line 50, "valve" should read --value--.
Line 51, "on" should read --to--.
Line 59, "block" should read --blocks--.
```

COLUMN 11

```
Line 21, "outputs Q_0-Q_15" should read
    --outputs Q_0-Q_14--.
Line 41, "to byte" should read --converted--.
Line 61, "16 Kbite." should read --16 Kbytes.--
```

UNITED STATES PATENT AND TRADEMARK OFFICE
CERTIFICATE OF CORRECTION

PATENT NO. : 5,621,440

DATED : April 15, 1997

INVENTOR(S) : KAZUYOSHI TAKAHASHI

It is certified that error appears in the above-identified patent and that said Letters Patent is hereby corrected as shown below:

COLUMN 12

Line 49, "correctted" should read --corrected--.
    Line 50, "RAM 208-206." should read --RAM 203-206.--

COLUMN 13

Line 32, "images" should read --image--
    Line 45, "registor" should read --register--.

COLUMN 14

Line 62, "of" should be deleted.
    Line 66, "and" should be deleted; and "therefore"
      should read --therefore the--.

COLUMN 15

Line 7, "for for" should read --for--.

COLUMN 16

Line 33, "so called" should read --so-called--.
    Line 62, "time is" should read --delay causes--.

UNITED STATES PATENT AND TRADEMARK OFFICE
CERTIFICATE OF CORRECTION

PATENT NO. : 5,621,440

DATED : April 15, 1997

INVENTOR(S): KAZUYOSHI TAKAHASHI

It is certified that error appears in the above-identified patent and that said Letters Patent is hereby corrected as shown below:

COLUMN 17

Line 6, "needed" should read --need--.
    Line 41, "it" should read --is--.
    Line 47, "system" should read --system,--
    Line 51, "so" should read --so---.
    Line 55, "nucleus" should read --nucleate--.

COLUMN 20

Line 2, "elements" should read --elements;--.
    Line 3," plurality" should read --the plurality--.

COLUMN 21

Line 11, "order and" should read --order; and--.

COLUMN 22

Line 5, "said" should read --wherein said--, and "generating" (second occurrence) should read "generates--.
    Line 11, "thereon said" should read --on said--.
    Line 38, "apparatus" should read --device--.
    Line 39, "reference signal" should read --predetermined clock--.
    Line 40, "apparatus" should read --device--.
    Line 52, "numbers" should read --number--.

UNITED STATES PATENT AND TRADEMARK OFFICE
CERTIFICATE OF CORRECTION

PATENT NO. : 5,621,440

DATED : April 15, 1997

INVENTOR(S) : KAZUYOSHI TAKAHASHI

It is certified that error appears in the above-identified patent and that said Letters Patent is hereby corrected as shown below:

<u>COLUMN 25</u>

Line 23, "different" should read --difference--.

<u>FIG. 32</u>

"OSCILATING" should read --OSCILLATING--.

Signed and Sealed this

Twenty-fourth Day of February, 1998

Attest:

BRUCE LEHMAN

*Attesting Officer*  *Commissioner of Patents and Trademarks*